(12) United States Patent
Eguchi

(10) Patent No.: US 6,826,314 B2
(45) Date of Patent: Nov. 30, 2004

(54) IMAGE SIZE TRANSFORMING APPARATUS, METHOD AND RECORD MEDIUM STORING IMAGE SIZE TRANSFORM PROGRAM THEREIN

(75) Inventor: Toru Eguchi, Yokohama (JP)

(73) Assignee: Fujitsu Limited, Kawasaki (JP)

(*) Notice: Subject to any disclaimer, the term of this patent is extended or adjusted under 35 U.S.C. 154(b) by 579 days.

(21) Appl. No.: 09/760,880

(22) Filed: Jan. 17, 2001

(65) Prior Publication Data

US 2001/0043759 A1 Nov. 22, 2001

(30) Foreign Application Priority Data

Mar. 30, 2000 (JP) ........................................ 2000-093196

(51) Int. Cl.[7] ................................................ G06K 9/32
(52) U.S. Cl. ...................................... 382/298; 358/451
(58) Field of Search ................................ 345/501–522, 345/561–569; 382/298–300; 358/450–452

(56) References Cited

U.S. PATENT DOCUMENTS

| | | | | |
|---|---|---|---|---|
| 4,901,171 A | * | 2/1990 | Urayama et al. | 360/74.6 |
| 5,371,839 A | * | 12/1994 | Fukunaga et al. | 345/589 |
| 5,864,344 A | * | 1/1999 | Ikedo | 345/426 |
| 6,014,125 A | * | 1/2000 | Herbert | 345/660 |
| 6,377,265 B1 | * | 4/2002 | Bong | 345/505 |
| 6,593,928 B1 | * | 7/2003 | Chang et al. | 345/501 |

* cited by examiner

Primary Examiner—Jingge Wu
(74) Attorney, Agent, or Firm—Staas & Halsey LLP

(57) ABSTRACT

An image size transforming apparatus of the present invention comprises a DDA processing unit which expands or contracts an original image by the digital differential analysis (DDA) to create an expanded or contracted image, and an initial value setting unit which uses a random number based initial value as the sum total initial value for the digital differential analysis. Upon the image contraction, the DDA processing unit figures out the DDA sum total at the current pixel position by adding a contracted image size to the initialized DDA sum total, at the original image pixel initializing position, but to the DDA sum total figured out at the immediately previous pixel position, at the other pixel positions. If the DDA sum total is not less than the original image size, then the DDA processing unit copies pixels at the current pixel position onto a contracted image and defines the result of subtraction of the image size from the current DDA value as the DDA sum total at the next pixel position. If the DDA sum total is less than the original image size, then the DDA processing unit thins out the pixels at the current pixel position without copying them and defines the current DDA sum total as the DDA sum total at the next pixel position. The above processings are iterated.

4 Claims, 26 Drawing Sheets

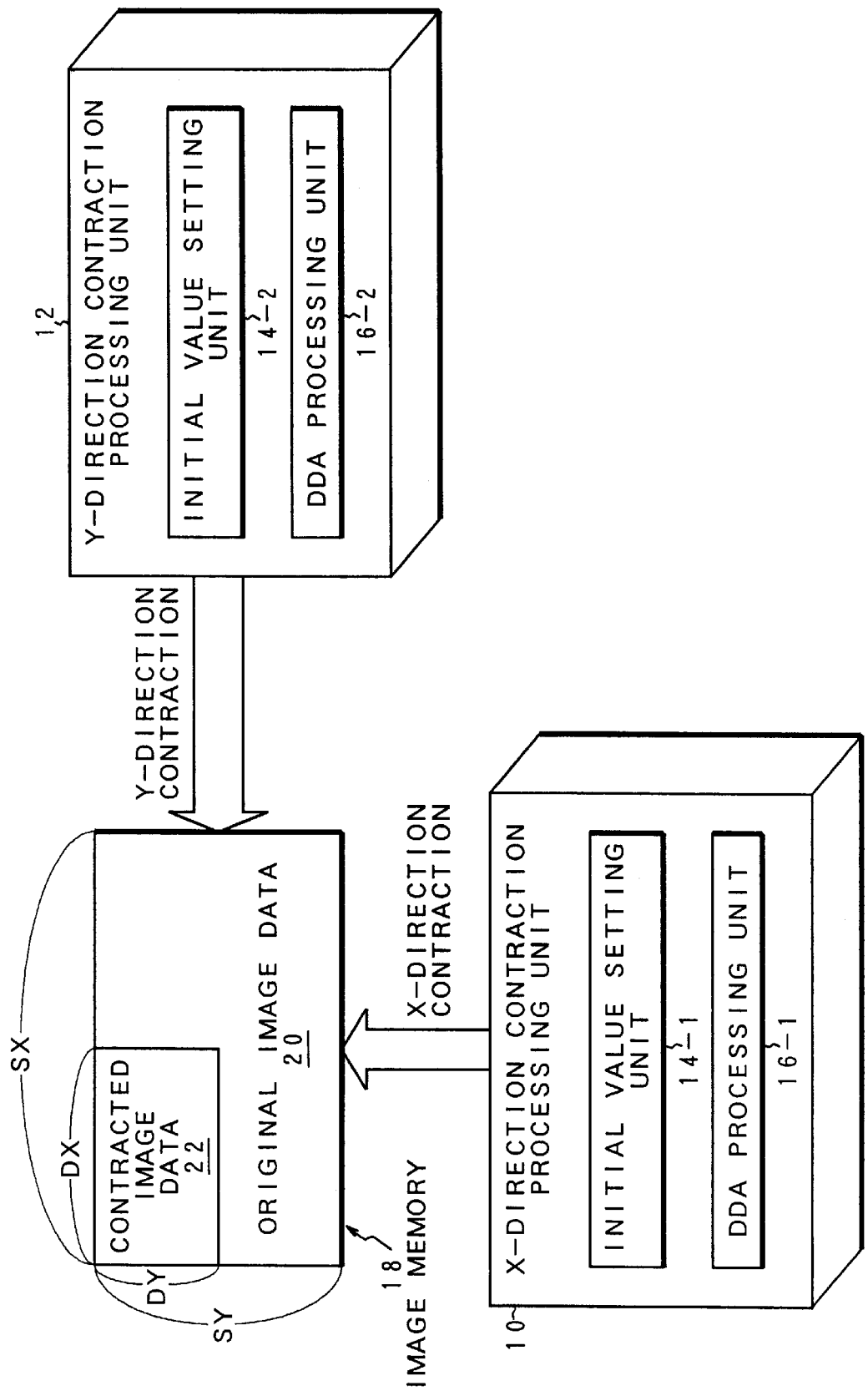

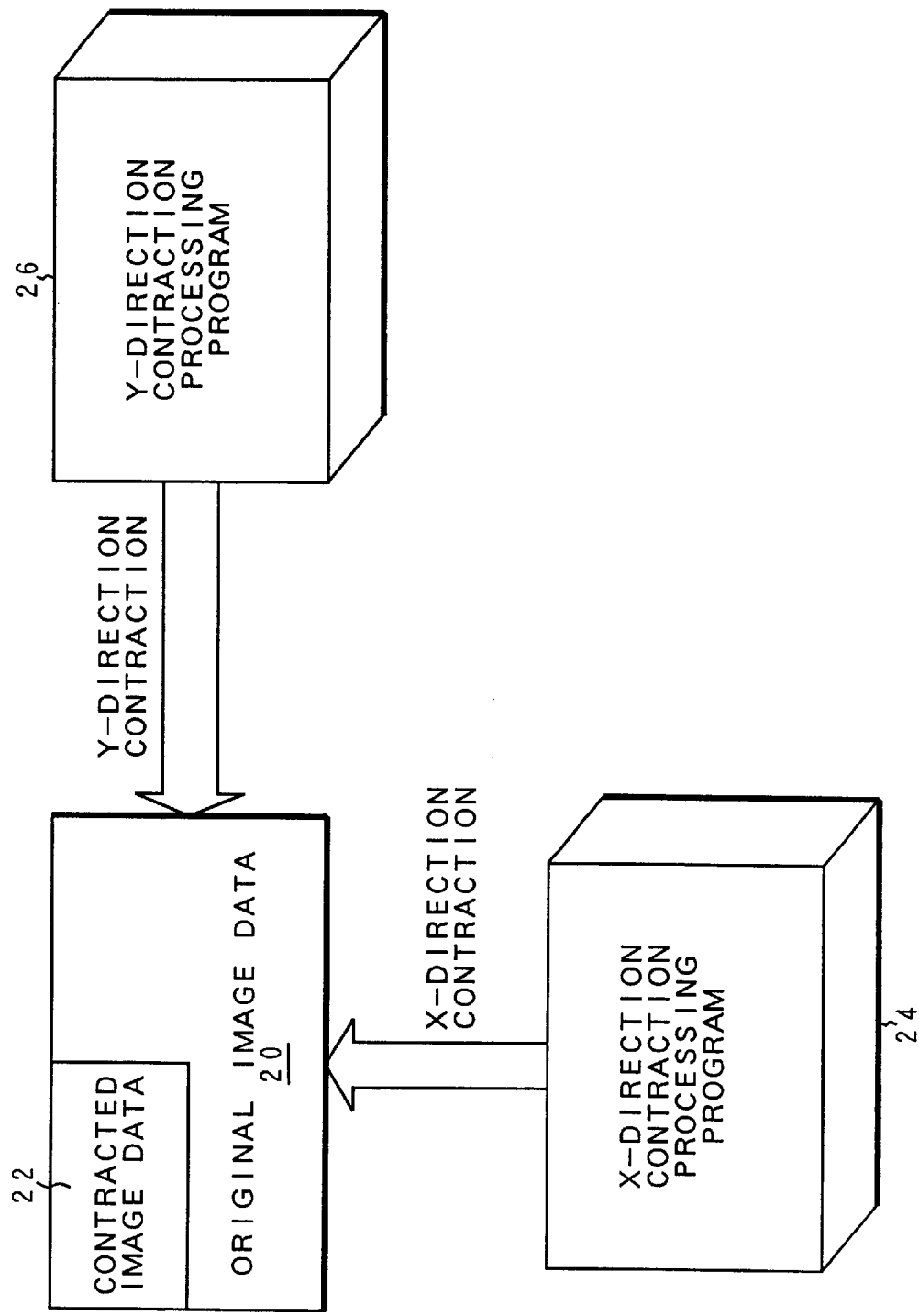

FIG. 3A
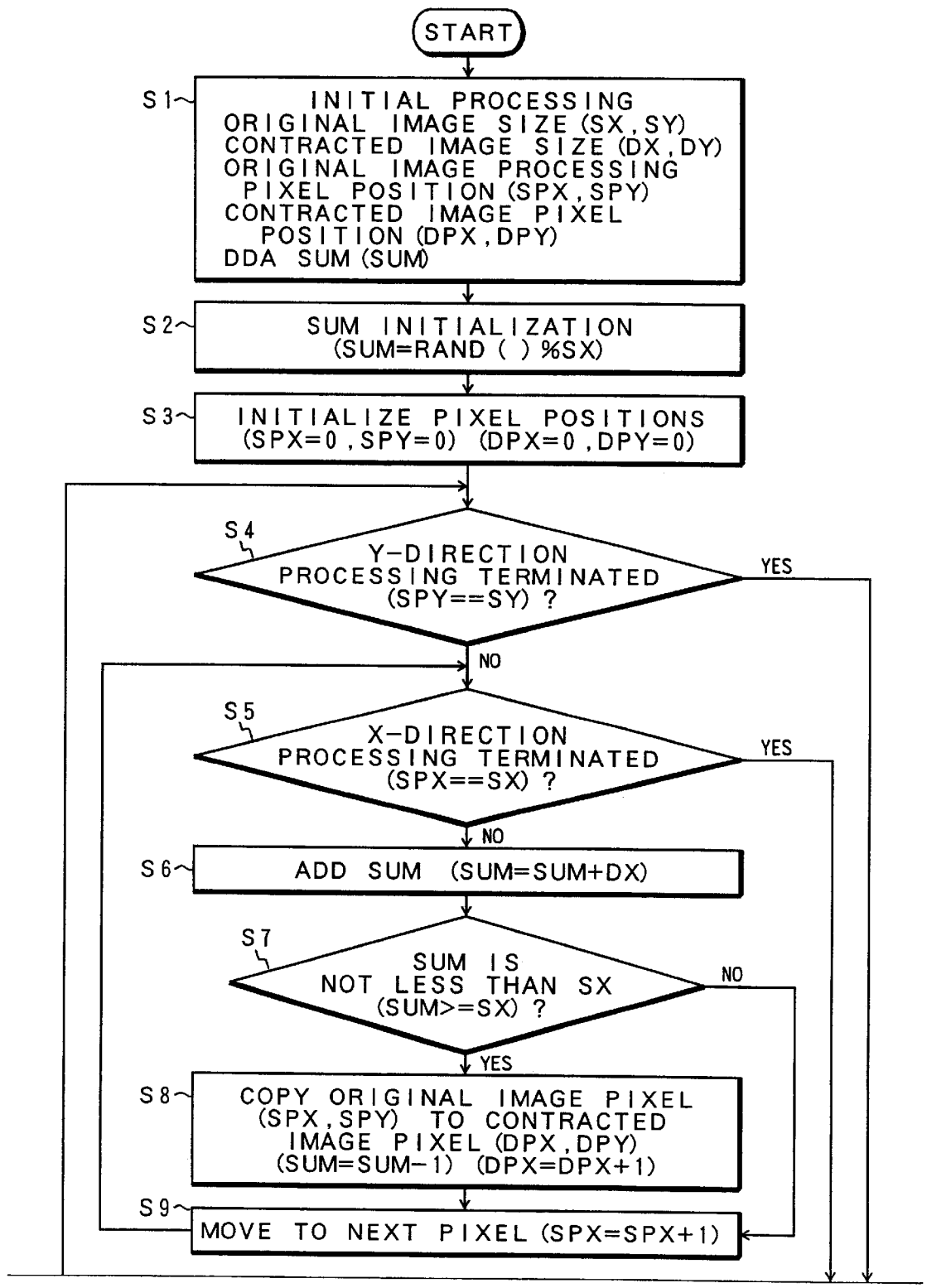

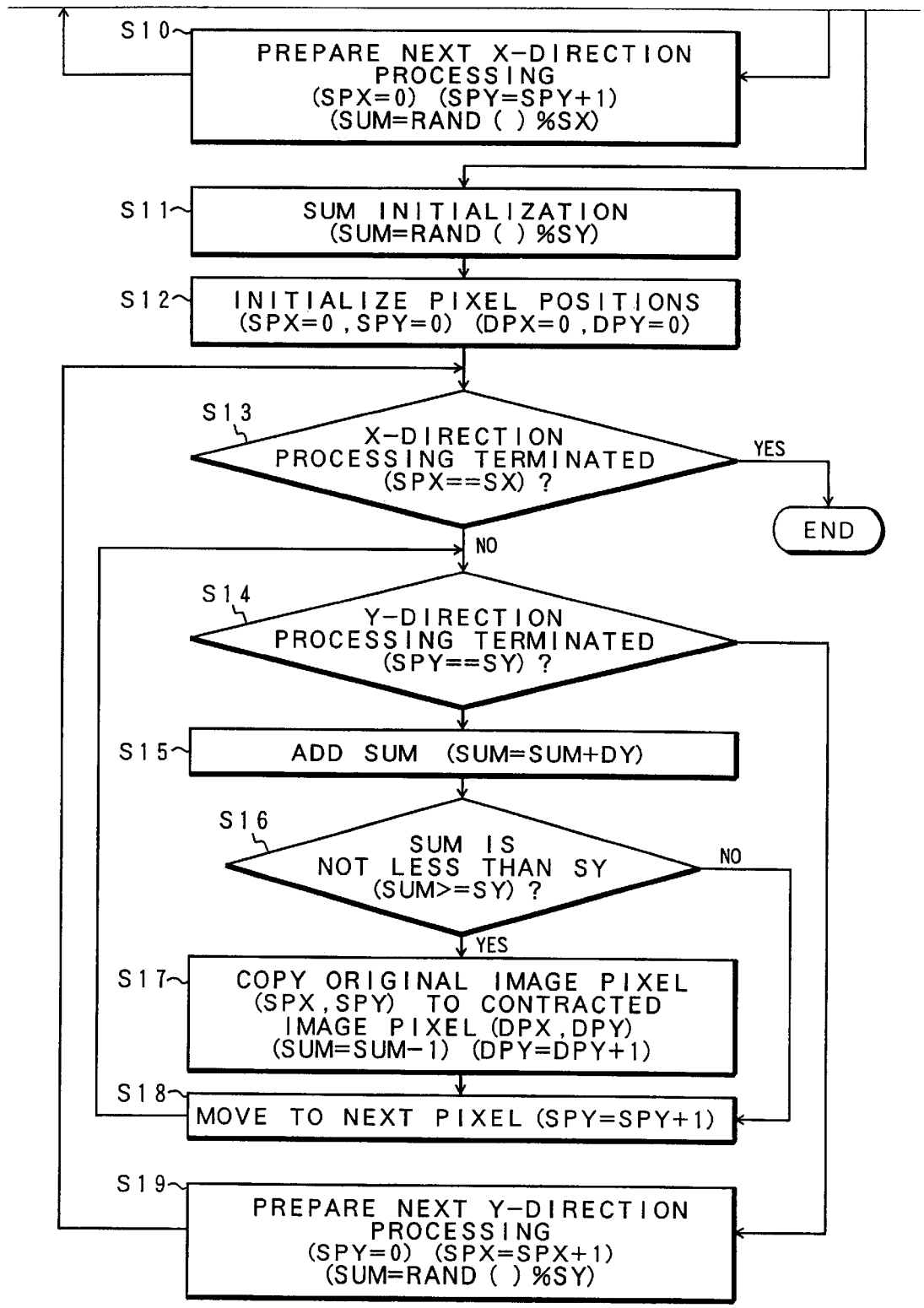

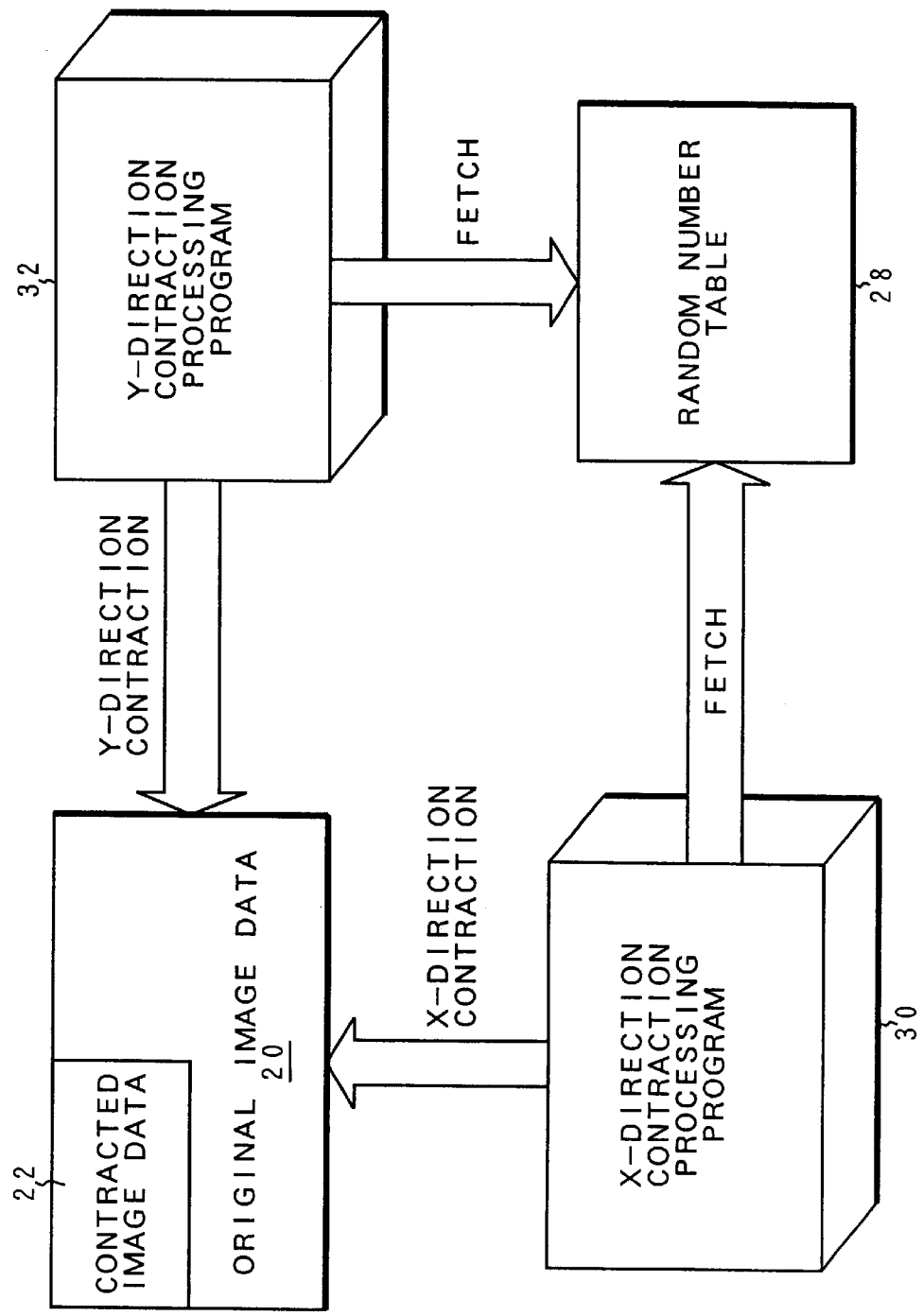

FIG. 8A
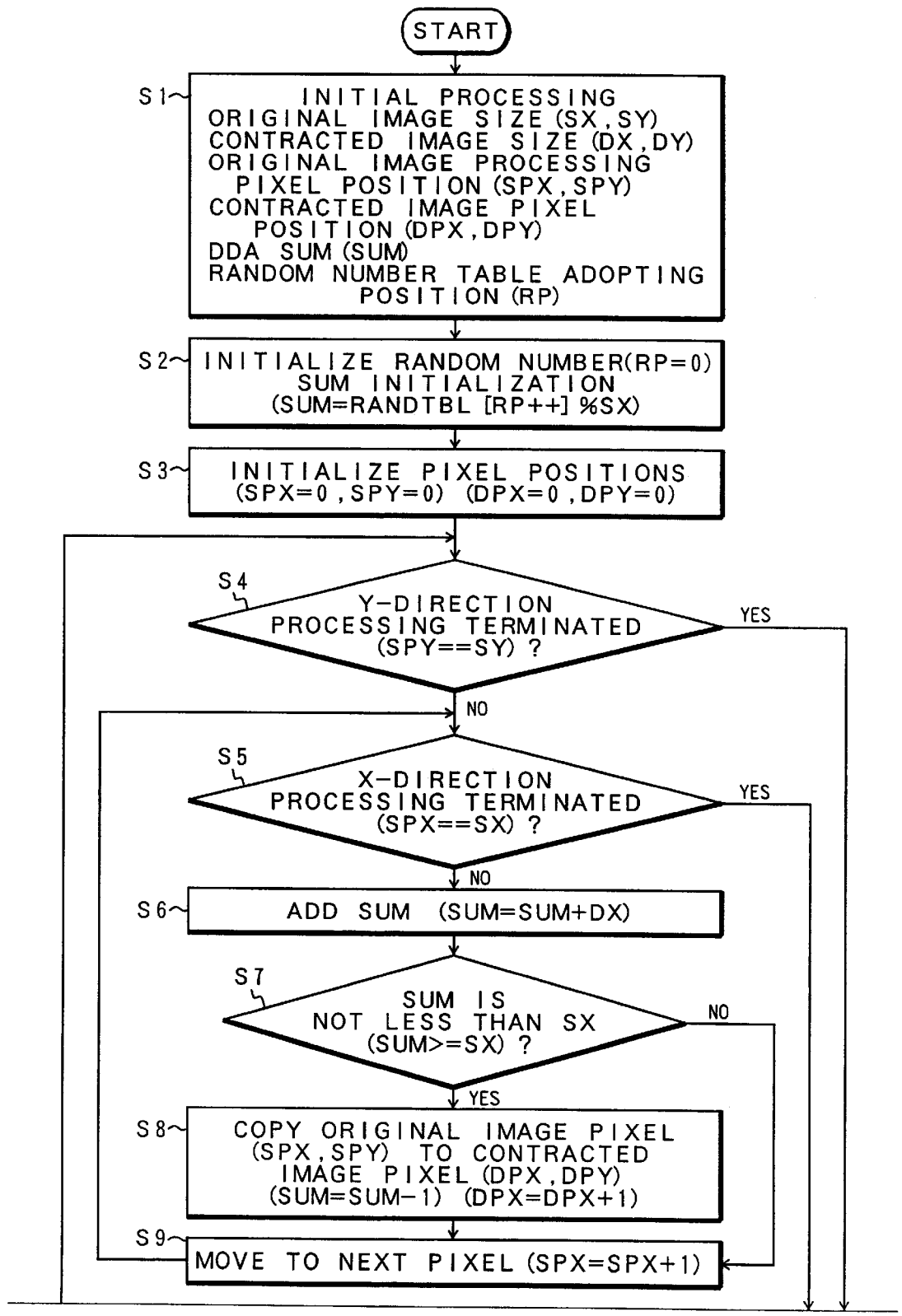

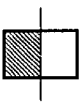
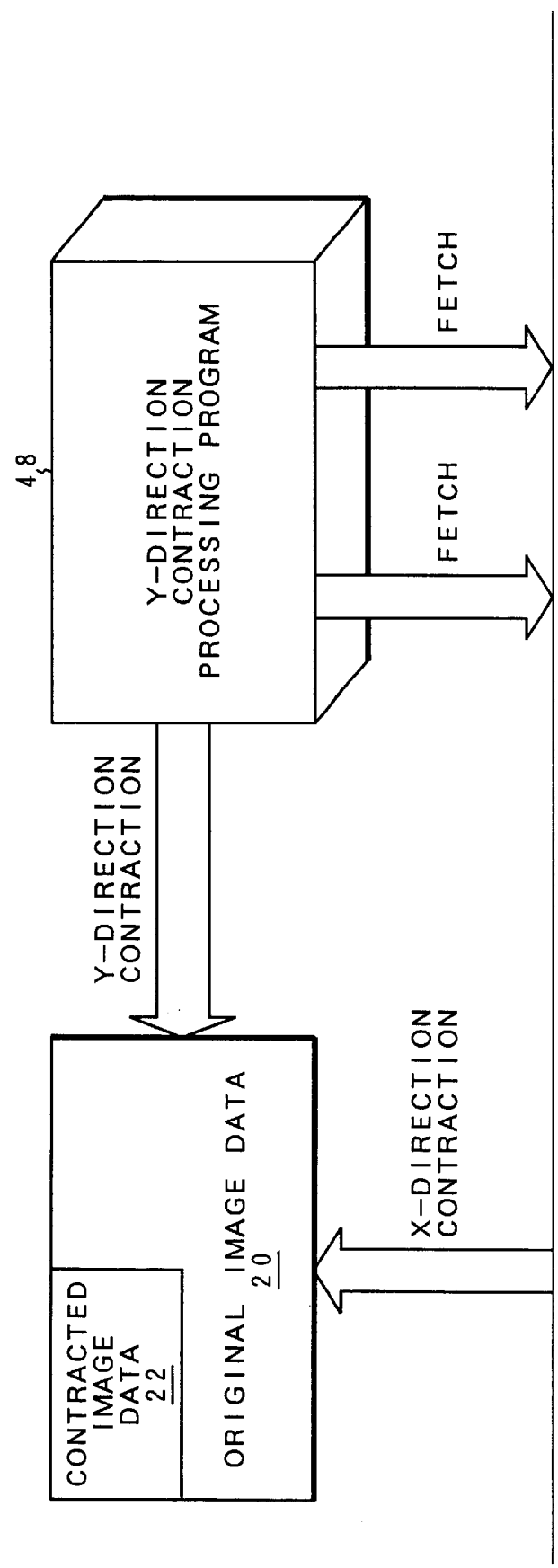
FIG.10A

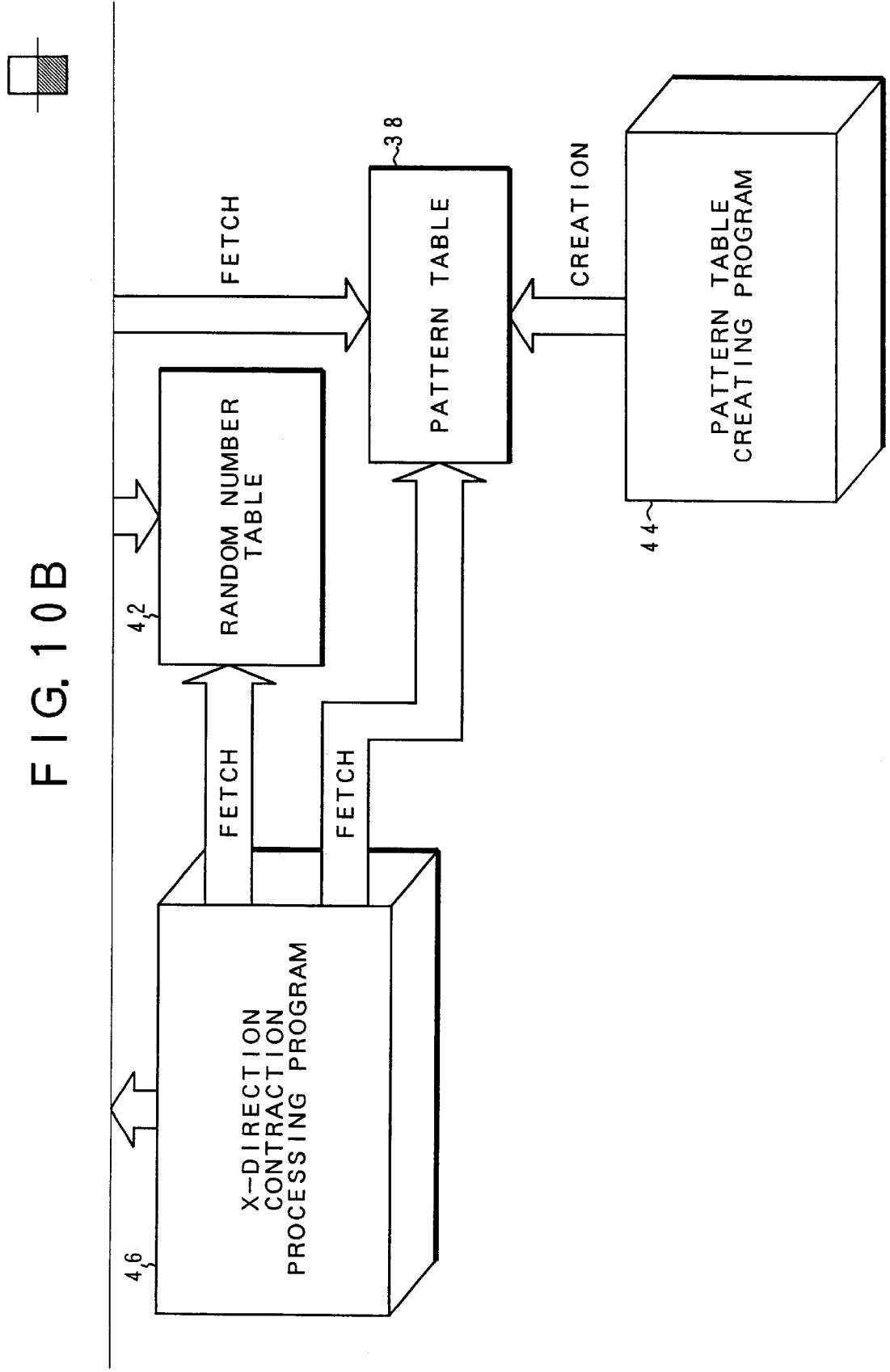

FIG. 12

| P 1  | 0 1 1 0 1 1 0 1 1 0 1 1 0 1 1 0 1 1 · · · · · 0 1 1 0 1 1 |
|------|-----------------------------------------------------------|
| P 2  | 1 0 1 1 0 1 1 0 1 1 0 1 1 0 1 1 0 1 · · · · · 1 0 1 1 0 1 |
| P 3  | 1 1 0 1 1 0 1 1 0 1 1 0 1 1 0 1 1 0 · · · · · 1 1 0 1 1 0 |
| P 4  | 0 1 1 0 1 1 0 1 1 0 1 1 0 1 1 0 1 1 · · · · · 0 1 1 0 1 1 |
| P 5  | 1 0 1 1 0 1 1 0 1 1 0 1 1 0 1 1 0 1 · · · · · 1 0 1 1 0 1 |
| ⋮    | ⋮                                                         |
| P 16 | 1 0 1 1 0 1 1 0 1 1 0 1 1 0 1 1 0 1 · · · · · 1 0 1 1 0 1 |

FIG. 13A
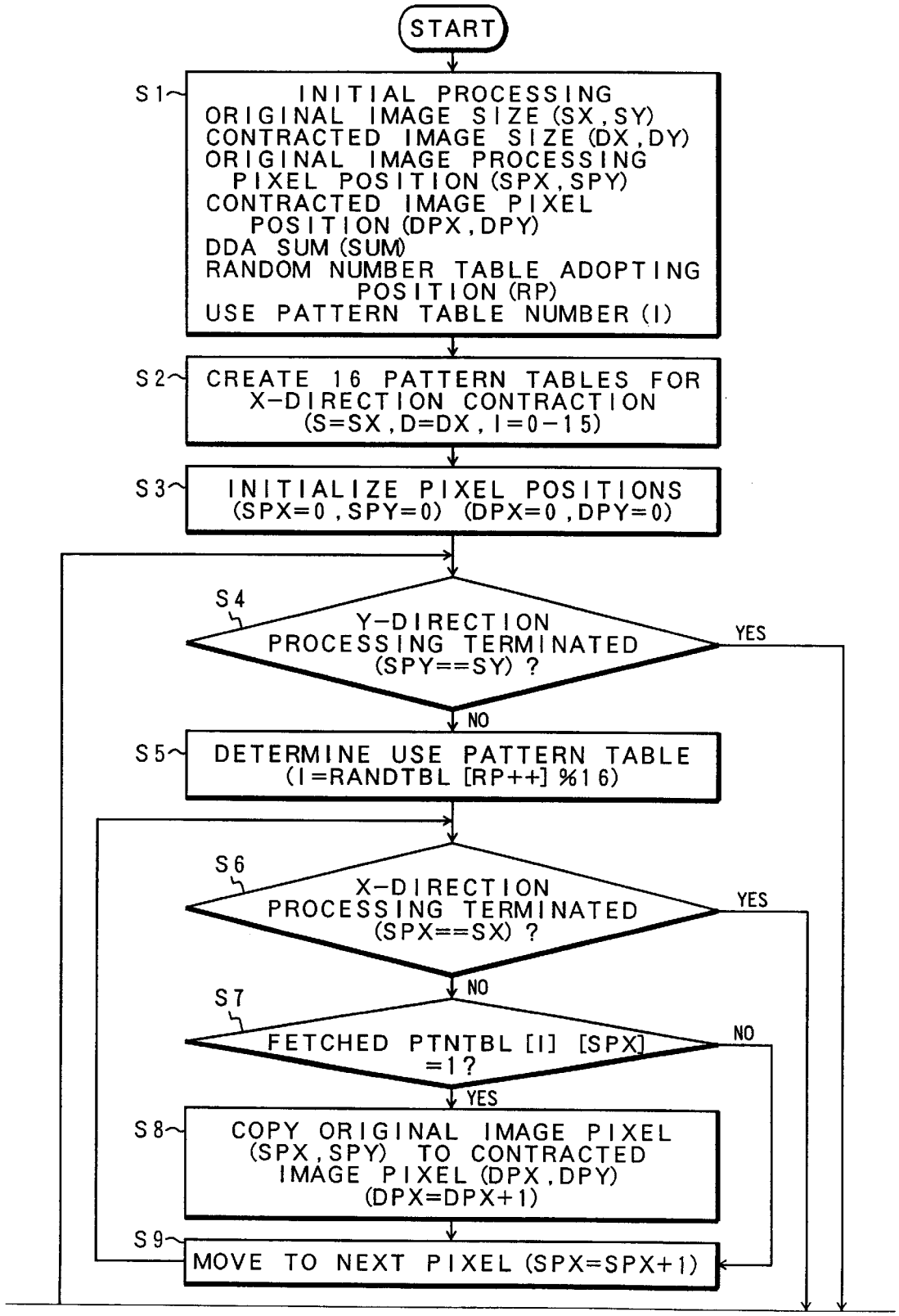

FIG. 13B
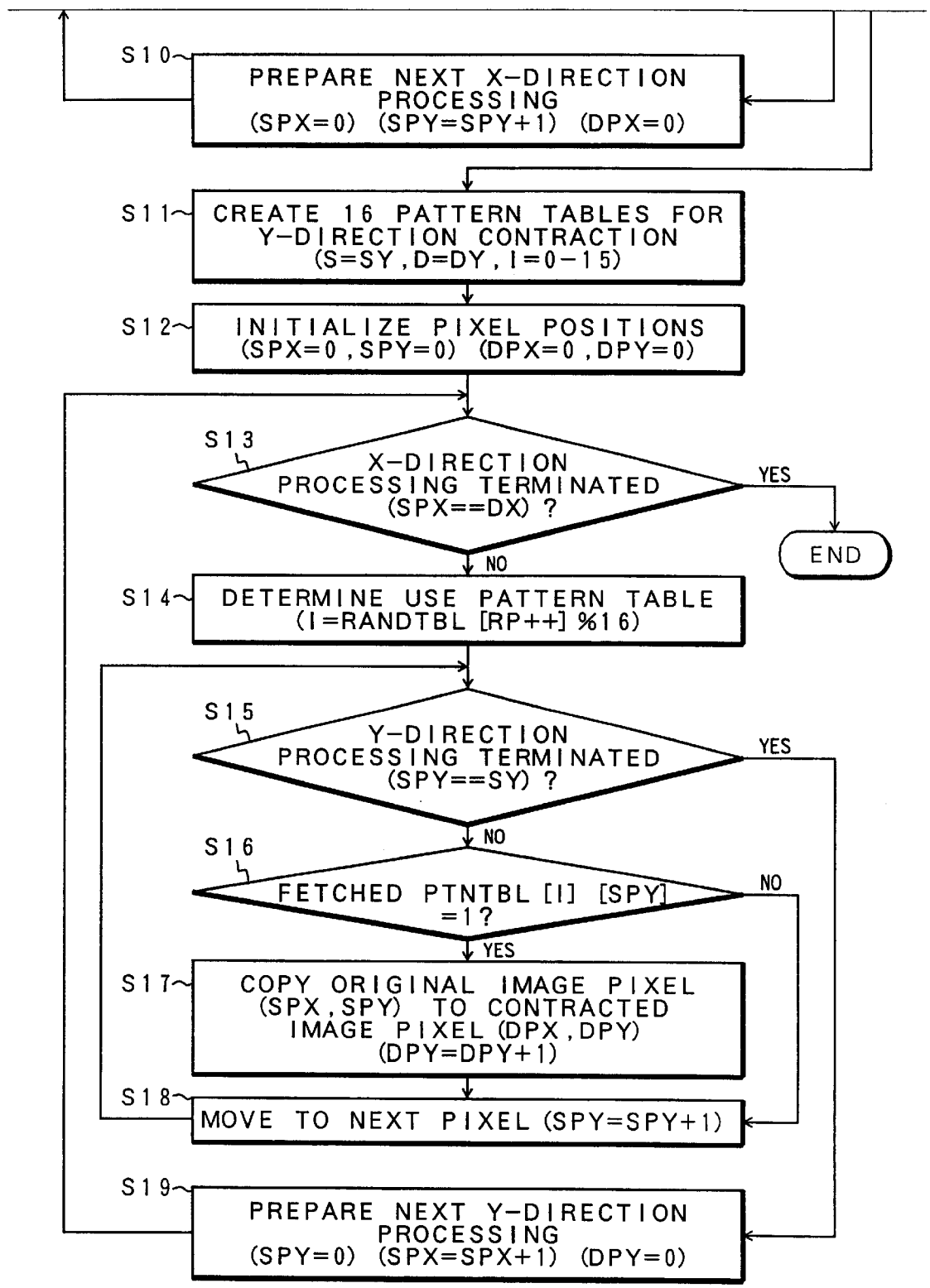

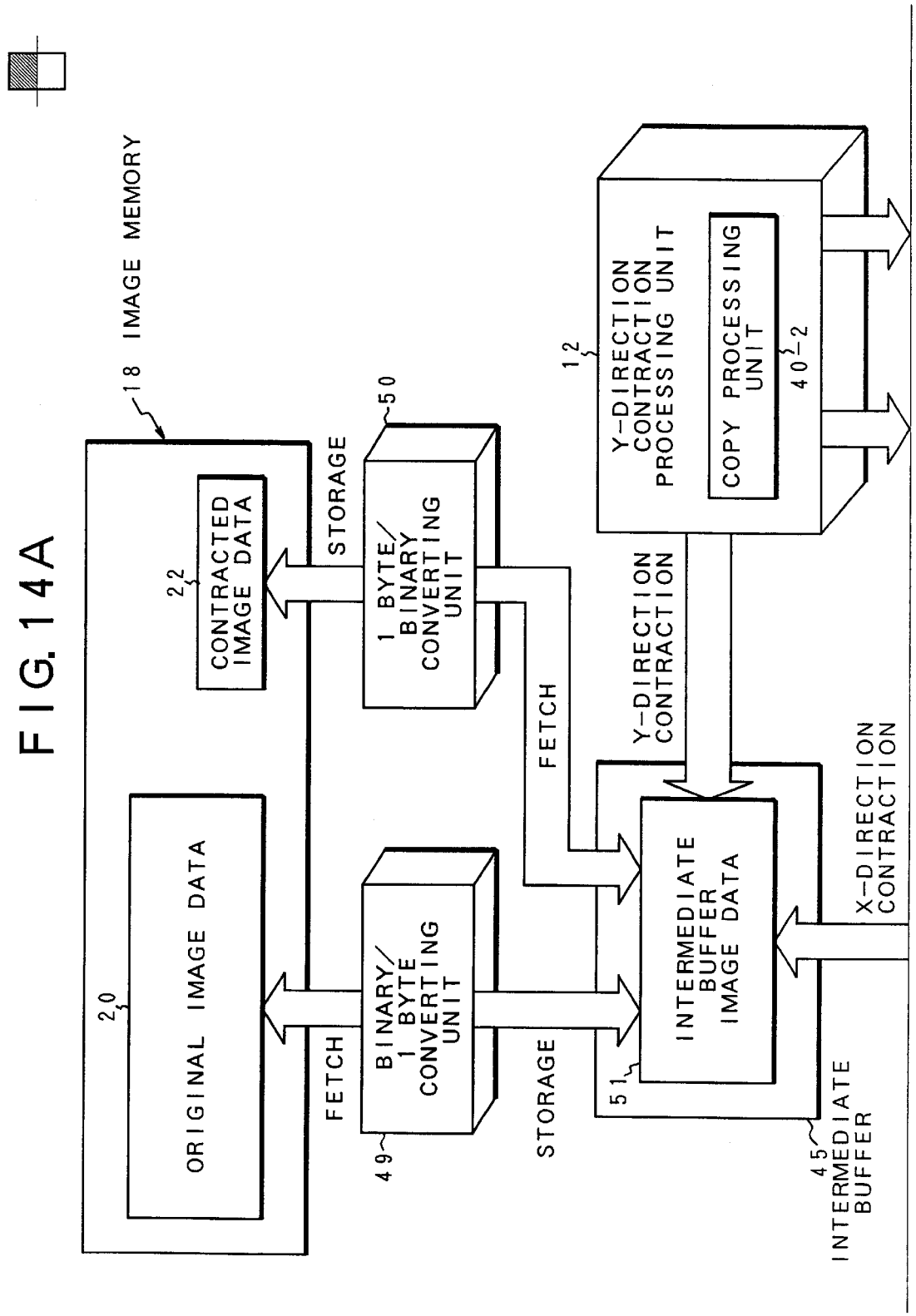

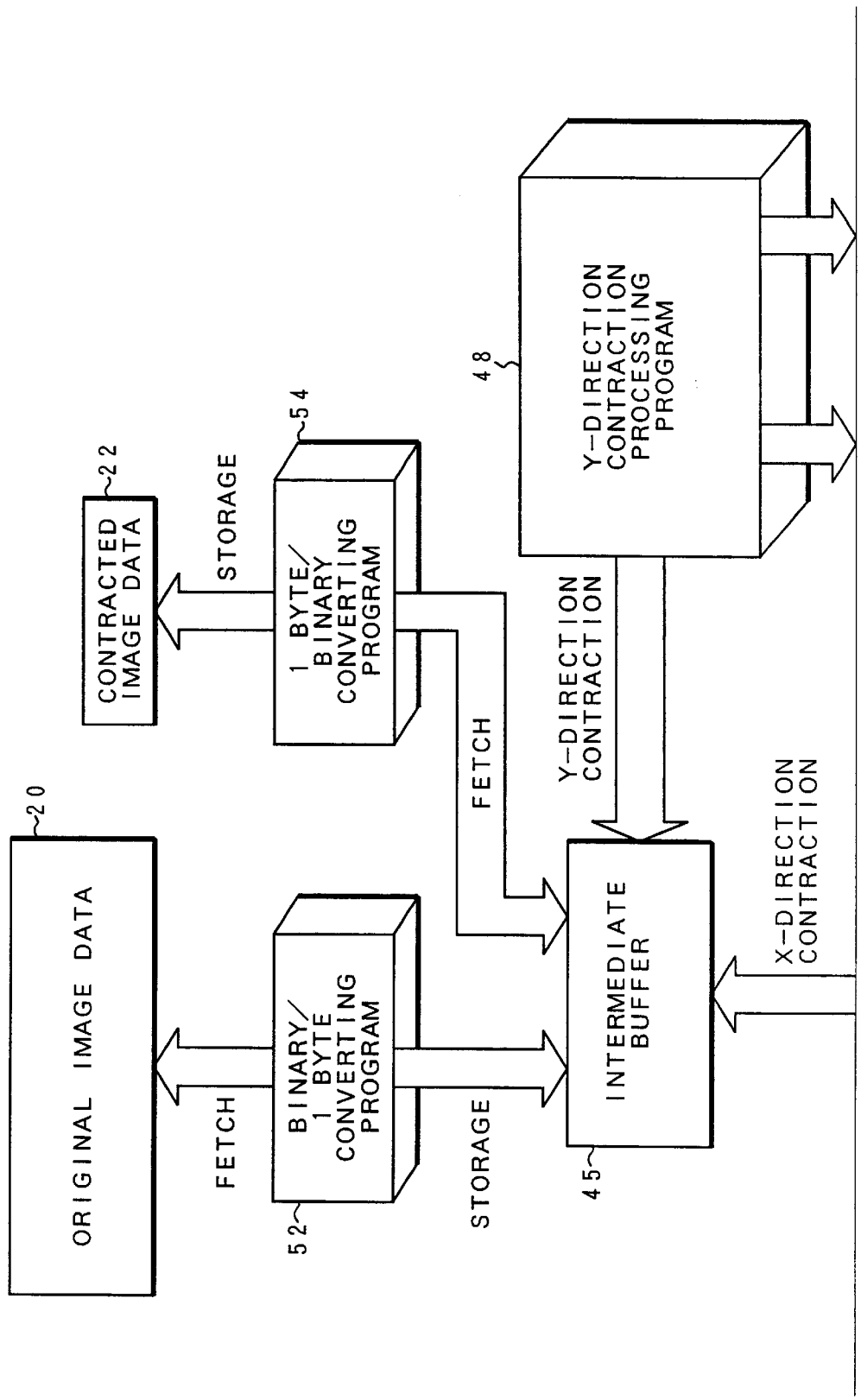
FIG. 15A

FIG. 18A
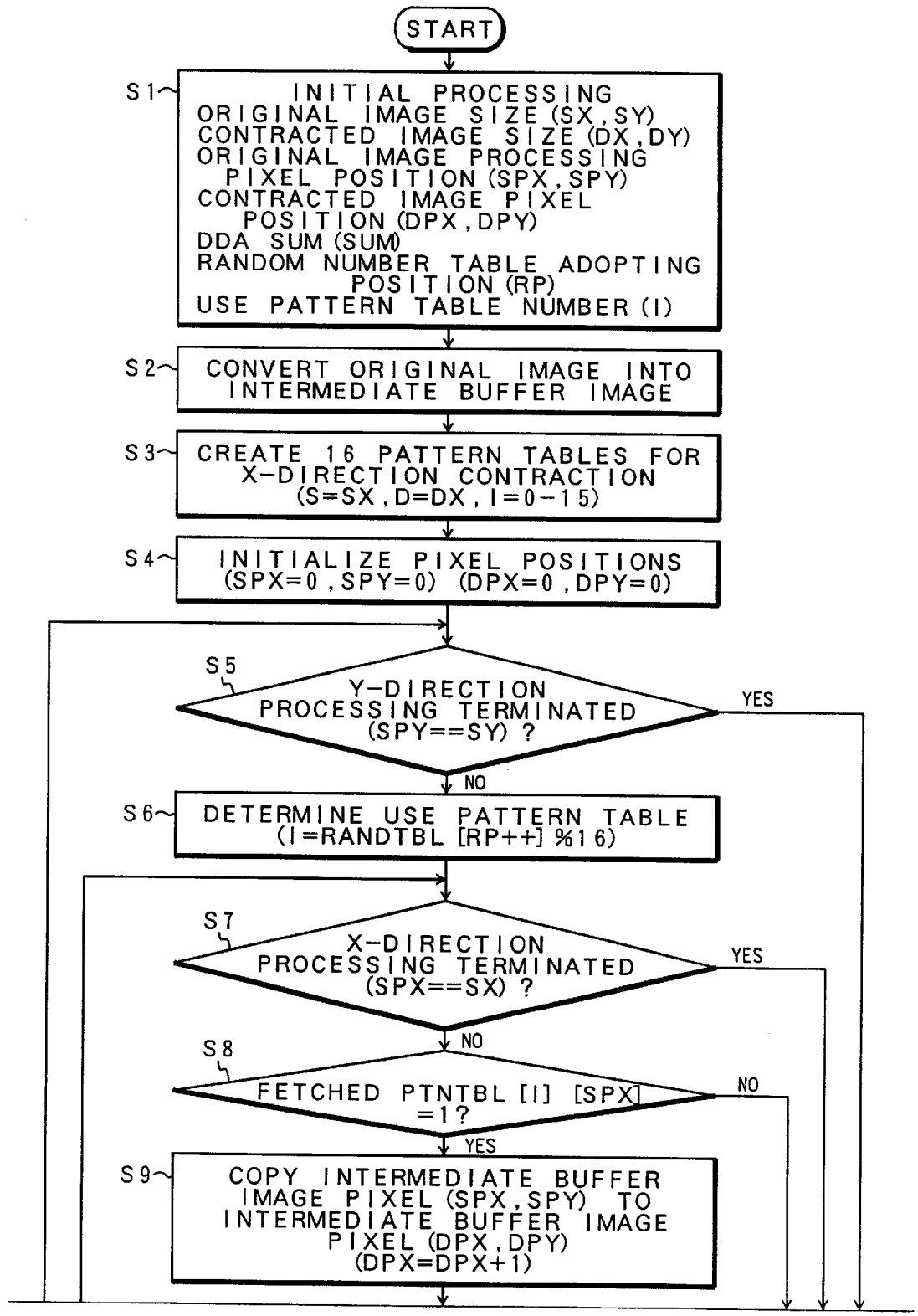

IMAGE SIZE TRANSFORMING APPARATUS, METHOD AND RECORD MEDIUM STORING IMAGE SIZE TRANSFORM PROGRAM THEREIN

BACKGROUND OF THE INVENTION

1. Field of the Invention

The present invention relates generally to an image size transforming apparatus and a method for contracting images by a digital differential analysis algorithm and to a record medium storing an image size transform program. More particularly, it relates to an image size transforming apparatus and a method preventing the occurrence of interference fringes upon the dot image contraction and to a record medium storing an image size transform program.

2. Description of the Related Arts

Typical image displaying apparatuses or image processing apparatuses for computers or cellular phones often need images expanded or contracted from original images. Conventional image expansion or contraction processing includes defining a determinant for the transform between original images and expanded or contracted image, finding the inverse determinant, and specifying and collecting the original image pixels relative to the expanded or contracted image pixels to thereby perform the expansion and contraction processing. The inverse matrix based expansion or contraction processing is however slow in processing speed due to its floating-point operations. Hence, to achieve a higher processing speed, the digital differential analysis (hereinafter referred to as DDA) algorithm is employed for the image expansion or contraction. The DDA algorithm based image expansion processing acquires expanded images by setting the expanded image size (pixel counts in the vertical and transverse directions) and processing the original image pixels by use of the overlap pattern for selecting whether the original image pixels are to be overlapped on the expanded image pixels for interpolation or be intactly copied. The DDA algorithm based image contraction processing acquires contracted images by setting the contracted image size (pixel counts in the vertical and transverse directions) and processing the original image pixels by use of the thinning pattern for selecting whether the original image pixels are to be copied onto contracted images or to be thinned out without being copied.

In the event of contracting images having a pattern periodicity such as dot images used for newspaper photographs, etc., however, the DDA algorithm based image contraction processing has suffered the occurrence of striped interference fringes in the expanded or contracted images as a result of the mutual interference between the periodic original image dot pattern and the overlap or thinning pattern due to the periodicity of the overlap pattern or thinning pattern deriving from the DDA algorithm. On the other hand, to implement any desired expansion ratios and contraction ratios, the image expansion or contraction processing not using the DDA algorithm has to prepare and store a great deal of overlap patterns and thinning patterns corresponding thereto, with the result that the storage capacity for storing the patterns becomes disadvantageously larger in spite of rapid processing by pattern use. Furthermore, in the event that the original images are binary images represented by white and black pixels, the pixel data are often represented by bits 1 and 0 on the computer, which may cause slow processing due to the difficulty of handling one-bit data on the computer.

SUMMARY OF THE INVENTION

The present invention provides an image size transforming apparatus and method capable of expansion and contraction without generating any interference fringes despite periodic original images such as dot patterns, and a record medium storing an image size transform program therein.

The present invention further provides an image size transforming apparatus and method capable of acquiring expanded and contracted images free from the interference fringes with the reduced number of use patterns of the DDA algorithm, and a record medium storing an image size transform program therein.

The present invention further provides an image size transforming apparatus and method in which the DDA algorithm based image processing is sped up through the conversion of bit data into byte data for handling.

According to a first aspect of the present invention there is provided an image size transforming apparatus comprising a DDA processing unit which creates an image expanded or contracted from an original image by a digital differential analysis (DDA); and an initial value setting unit which sets a random number based initial value as a sum total initial value of the digital differential analysis. Herein, upon the image contraction, the DDA processing unit figures out a DDA sum total at a current pixel position by adding a contracted image size to an initialized DDA sum total, at an original image pixel initial position, but to a DDA sum total figured out at an immediately previous pixel position, at the other pixel positions, the DDA processing unit, if the DDA sum total is not less than the original image size, copying pixels at the current pixel position onto a contracted image and defining the result of subtraction of the image size from the current DDA sum total as the DDA sum total at the next pixel position, the DDA processing unit, if the DDA sum total is less than the original image size, thinning out pixels at the current pixel position without copy thereof and defining the current DDA sum total as the DDA sum total at the next pixel position, the DDA processing unit iterating the above processings. The initial value setting unit determines a random number for each pixel initial position of the original image and defines the remainder when the random number is divided by the original image size as a DDA sum total initial value. For this reason, even though a periodic mesh pattern appears on any original image such as a binary image or a color image, the interference fringes cannot occur on the contracted image due to the random number components contained in the pixel selection determined by the digital differential analysis. The initial value setting unit may generate random numbers by use of a random number table. The random numbers are acquired from the random number table instead of calculation in this manner, and hence an increased processing speed can be achieved.

According to a second aspect of the present invention there is provided an image size transforming apparatus comprising a DDA processing unit which from the array of a predetermined number of pixels of an original image, creates a bit pattern indicative of the execution or nonexecution of a pixel copy onto a contracted image (or of an overlapping pixel copy onto an expanded image), by a digital differential analysis; a pattern table which stores therein a plurality of different bit patterns obtained by shifting the bit pattern created by the DDA processing unit in series by a predetermined number of bits; and a copy processing unit which when extracting a pixel string of the bit pattern length from the original image to transform it into a contracted image (or an expanded image), iterates processing for selecting a specific bit pattern from the pattern table by use of a random number to transform pixels of the original image into pixels of the contracted image(or of the expanded image). In this manner, by creating in advance the pattern table instead of calculating for each pixel thinning upon the contraction (or each pixel overlapping upon the expansion) by the digital differential analysis algorithm, it is possible to reduce the amount of calculation involved in the digital differential analysis algorithm to thereby speed up the processing. The number of the patterns enough to prevent the occurrence of the interference fringes can be 16 for example whereby the size transformation is possible to any desired size without holding a great number of overlapping patterns or thinning patterns. Upon the image contraction by this image size transforming apparatus, the DDA processing unit figures out a DDA sum total at a current pixel position by adding a contracted image size to an initialized DDA sum total, at an original image pixel initial position, but to a DDA sum total figured out at an immediately previous pixel position, at the other pixel positions, the DDA processing unit, if the DDA sum total is not less than the original image size, imparting bit information indicative of a pixel copy to the bit pattern and defining the result of subtraction of the image size from the current DDA sum total as the DDA sum total at the next pixel position, the DDA processing unit, if the DDA sum total is less than the original image size, imparting the other bit information indicative of thinning in place of the copy to the bit pattern and defining the current DDA sum total as the DDA sum total at the next pixel position, the DDA processing unit iterating the above processings to thereby create the plurality of different bit patterns. In this case, the copy processing unit defines the remainder when the random number is divided by the number of bit patterns, as a pattern selection value. The copy processing unit generates the random numbers for selecting the bit patterns, by use of a random number table, to thereby achieve a speedup of the processing.

The image size transforming apparatus of the present invention further comprises a bit/byte converting unit which converts binary pixel 1-bit data of the original image into 1-byte data, which are stored in an intermediate buffer to allow the copy processing unit to make image size transform byte processing; and a byte/bit converting unit which inversely converts the intermediate buffer image 1-byte data after copy processing into original 1-bit data to create a contracted image. In this manner, in spite of the bit representation of the original image, a high-speed processing can be achieved by converting the bit data into byte data and storing them into the intermediate buffer to perform the original image overlapping interpolation or thinning in the easy-to-process byte data format.

According to a third aspect of the present invention there is provided an image size transforming method comprising an initial value setting step which includes setting a random number based initial value as a sum total initial value of a digital differential analysis (DDA) and a DDA processing step which includes creating an image expanded or contracted from an original image by the digital differential analysis; the initial value setting step including determining a random number for each pixel initial position of the original image and defining the remainder when the random number is divided by the original image size as a DDA sum total initial value; the DDA processing step including, upon the image contraction, figuring out a DDA sum total at a current pixel position by adding a contracted image size to an initialized DDA sum total, at an original image pixel initial position, but to a DDA sum total figured out at an immediately previous pixel position, at the other pixel positions, the DDA processing step including, if the DDA sum total is not less than the original image size, copying pixels at the current pixel position onto a contracted image and defining the result of subtraction of the image size from the current DDA sum total as the DDA sum total at the next pixel position, the DDA processing step including, if the DDA sum total is less than the original image size, thinning out pixels at the current pixel position without copy thereof and defining the current DDA sum total as the DDA sum total at the next pixel position, the DDA processing step including iterating the above processings.

According to a fourth aspect of the present invention there is provided an image size transforming method comprising a DDA processing step which includes, from the array of a predetermined number of pixels of an original image, creating a bit pattern indicative of the execution or nonexecution of a pixel copy onto a contracted image or of an overlapping pixel copy onto an expanded image, by a digital differential analysis (DDA); a table creating step which includes creating a pattern table that stores therein a plurality of different bit patterns obtained by shifting the bit pattern created in the DDA processing step in series by a predetermined number of bits; and a copy processing step which includes, when extracting a pixel string of the bit pattern length from the original image to transform it into a contracted image or an expanded image iterating processing for selecting a specific bit pattern from the pattern table by use of a random number to transform pixels of the original image into pixels of the contracted image or of the expanded image.

In this image size transforming method, the DDA processing step includes, upon the image contraction, figuring out a DDA sum total at a current pixel position by adding a contracted image size to an initialized DDA sum total, at an original image pixel initial position, but to a DDA sum total figured out at an immediately previous pixel position, at the other pixel positions, the DDA processing step includes, if the DDA sum total is not less than the original image size, imparting bit information indicative of a pixel copy to the bit pattern and defining the result of subtraction of the image size from the current DDA sum total as the DDA sum total at the next pixel position, the DDA processing step includes, if the DDA sum total is less than the original image size, imparting the other bit information indicative of thinning in place of the copy to the bit pattern and defining the current DDA sum total as the DDA sum total at the next pixel position, the DDA processing unit iterating the above processings to thereby create the plurality of different bit patterns.

According to a fifth aspect of the present invention there is provided a computer readable record medium storing an image size transforming program therein, the image size transforming program comprising an initial value setting step which includes setting a random number based initial value as a sum total initial value of a digital differential analysis (DDA); and a DDA processing step which includes creating an image expanded or contracted from an original image by the digital differential analysis; the initial value setting step including determining a random number for each pixel initial position of the original image and defining the remainder when the random number is divided by the original image size as a DDA sum total initial value; the DDA processing step including, upon the image contraction, figuring out a DDA sum total at a current pixel position by adding a contracted image size to an initialized DDA sum total, at an original image pixel initial position, but to a DDA sum total figured out at an immediately previous pixel position, at the other pixel positions, the DDA processing step including, if the DDA sum total is not less than the original image size, copying pixels at the current pixel position onto a contracted image and defining the result of subtraction of the image size from the current DDA sum total as the DDA sum total at the next pixel position, the DDA processing step including, if the DDA sum total is less than the original image size, thinning out pixels at the current pixel position without copy thereof and defining the current DDA sum total as the DDA sum total at the next pixel position, the DDA processing step including iterating the above processings.

According to a sixth aspect of the present invention there is provided a computer readable record medium storing an image size transforming program therein, the image size transforming program comprising a DDA processing step which includes, from the array of a predetermined number of pixels of an original image, creating a bit pattern indicative of the execution or nonexecution of a pixel copy onto a contracted image or of an overlapping pixel copy onto an expanded image, by a digital differential analysis (DDA); a table creating step which includes creating a pattern table that stores therein a plurality of different bit patterns obtained by shifting the bit pattern created in the DDA processing step in series by a predetermined number of bits; and a copy processing step which includes, when extracting a pixel string of the bit pattern length from the original image to transform it into a contracted image or an expanded image, iterating processing for selecting a specific bit pattern from the pattern table by use of a random number to transform pixels of the original image into pixels of the contracted image or of the expanded image.

The DDA processing step of the image size transforming program stored in this storage medium includes, upon the image contraction, figuring out a DDA sum total at a current pixel position by adding a contracted image size to an initialized DDA sum total, at an original image pixel initial position, but to a DDA sum total figured out at an immediately previous pixel position, at the other pixel positions, the DDA processing step includes, if the DDA sum total is not less than the original image size, imparting bit information indicative of a pixel copy to the bit pattern and defining the result of subtraction of the image size from the current DDA sum total as the DDA sum total at the next pixel position, the DDA processing step includes, if the DDA sum total is less than the original image size, imparting the other bit information indicative of thinning in place of the copy to the bit pattern and defining the current DDA sum total as the DDA sum total at the next pixel position, the DDA processing unit iterating the above processings to thereby create the plurality of different bit patterns.

The above and other objects, aspects, features and advantages of the present invention will become more apparent from the following detailed description with reference to the accompanying drawings.

BRIEF DESCRIPTION OF THE DRAWINGS

FIG. 1 is a block diagram of an embodiment of the present invention;

FIG. 2 is an explanatory diagram of the program structure corresponding to FIG. 1;

FIGS. 3A and 3B are flowcharts of image contraction processing by FIG. 1;

FIG. 7 is an explanatory diagram of the program structure corresponding to FIG. 6;

FIGS. 8A and 8B are flowcharts of image contraction processing by FIG. 6;

FIG. 10 is an explanatory diagram of the program structure corresponding to FIG. 9;

FIG. 12 is an explanatory diagram of the pattern table storing 16 patterns of FIG. 9 therein;

FIGS. 13A and 13B are flowcharts of the contraction processing of FIG. 9;

FIGS. 14A and 14B are block diagrams of a further embodiment of the present invention executing a bit data to byte data conversion;

FIGS. 18A and 18B are flowcharts of contraction processing of FIGS. 14A and 14B.

DETAILED DESCRIPTION OF THE PREFERRED EMBODIMENTS

Figure 4:
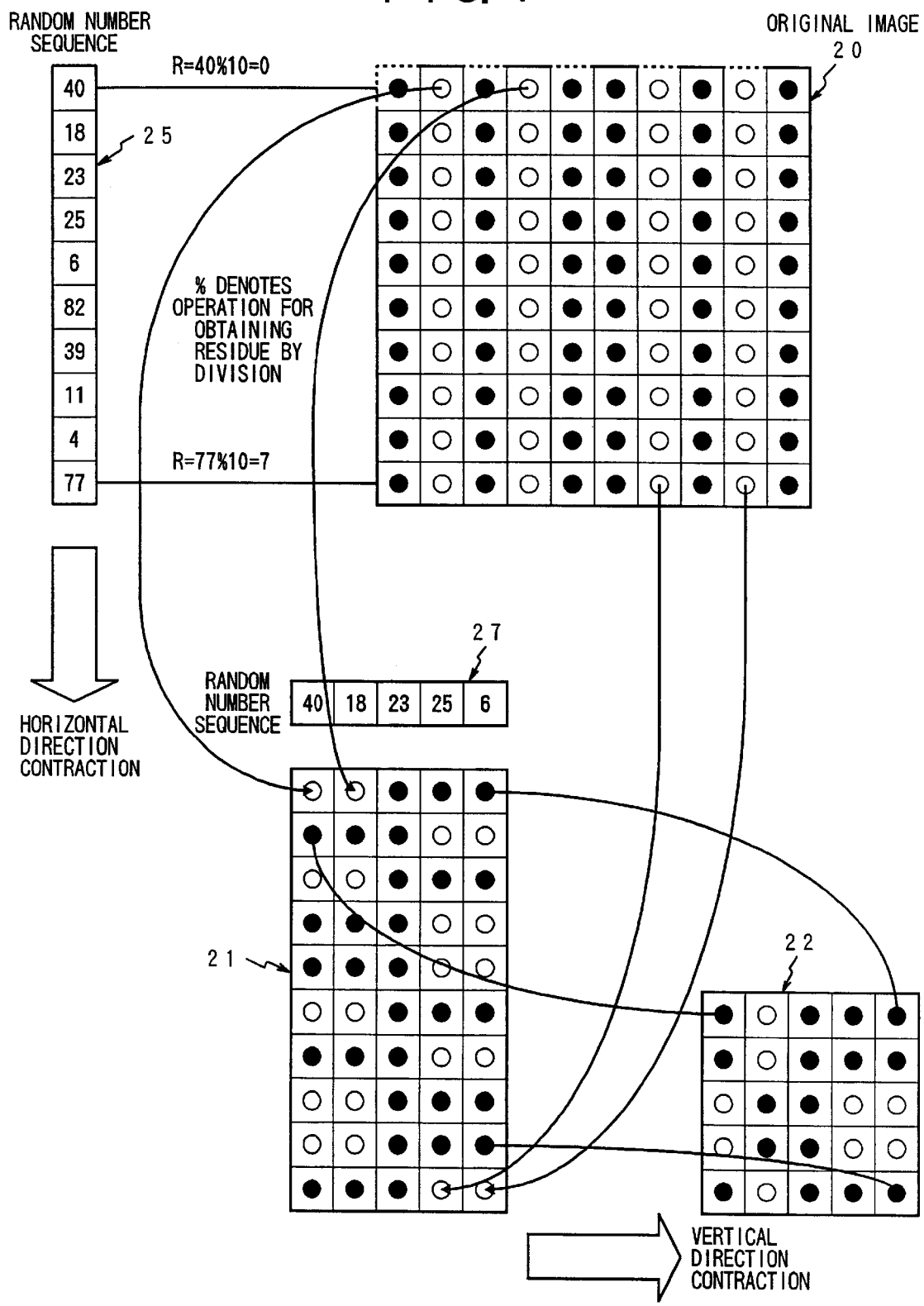
FIG. 4 is an explanatory diagram of the contraction processing when the initial value of the sum total is set by random numbers in FIG. 1.

FIG. 1 is a block diagram of an image size transforming apparatus in accordance with the present invention, showing the case of image contraction by way of example. The image size transforming apparatus of the present invention is made up of an X-direction contraction processing unit 10, a Y-direction contraction processing unit 12 and an image memory 18. The X-direction contraction processing unit 10 comprises an initial value setting unit 14-1 and a DDA processing unit 16-1. The DDA processing unit 16-1 contracts an original image by a digital differential analysis algorithm to generate a contracted image. The initial value setting unit 14-1 sets a random number based initial value as the sum total used for the digital differential analysis processing effected in the DDA processing unit 16-1. A DDA processing unit 16-2 of the Y-direction contraction processing unit 12 also contracts an original image by the digital differential analysis algorithm to generate a contracted image. The initial value setting unit 14-2 sets a random number based initial value as the initial value of the sum total in the digital differential analysis processing effected by the DDA processing unit 16-2. The image memory 18 stores original image data 20 to be contracted and contracted image data 22 after contraction processing. Stored as the original image data 20 in this embodiment are binary image data composed of dot pattern images for use in newspaper photographs. The dot pattern includes a multiplicity of dots arranged, each dot consisting of 909 dpi in case of newspapers for example, to thereby represent an image such as a photograph or a picture. For this reason, the dot pattern image data stored as the original image data 20 have a nature of the periodic binary image data depending on the dot size.

Description will then be made of the principle of the contraction processing by the random number based digital differential analysis for use in the image contraction of the present invention. Let (SX, SY) be the original image size of the original image data 20 stored in the image memory 18. The values SX and XY representing the image size is indicative of the pixel count. Let (DX, DY) be the contracted image size of the contracted image data 22 obtained by contracting the original image data 20. The position of each pixel of the original image data 20 and of the contacted image data 22 is represented by the original image pixel position (SPX, SPY) and the contracted image pixel position (DPX, DPY), respectively. In the digital differential analysis processing, the sum total is figured out for each pixel position for the execution of each processing. This sum total is represented as SUM. The contraction processing of the original data 20 includes X-direction contraction processing of the original image data 20 by the X-direction contraction processing unit 10 and subsequent Y-direction contraction processing of the X-direction contracted original image data by the Y-direction contraction processing unit 12 to thereby acquire the contracted image data 22. In the case of the X-direction contraction of the digital differential analysis based contraction processing, the contraction processing is carried out in the order of pixels from the first row pixels to the final row pixels of the original image data 20. At the leading pixel position in each row, the initial value setting unit 14-1 makes the sum total initialization based on the random number. Similarly, in the Y-direction contraction processing unit 12, the contraction processing is carried out from the first column up to the final column of the original image data 20 and the initial value setting unit 14-2 performs the sum total initialization using the random numbers upon the start of the leading pixel processing for each column. That is, the initial value setting units 14-1 and 14-2 find a random number RAND ( ) from any random number calculation formula when performing the contraction processing of the leading pixel in the row direction or in the column direction of the original pixel data 20, and make the initialization of the sum total SUM from the random number RAND ( ). The sum total initialization based on the random numbers is carried out by the following expression.

(Initialized sum total)=the remainder of (random number)/(original image size)

$$X\text{-direction } SUM=RAND(\ )\ \%\ SX \quad (1)$$

$$Y\text{-direction } SUM=RAND(\ )\ \%\ SY \quad (2)$$

Subsequent to the completion of such sum total initialization by the initial value setting units 14-1 and 14-2, the DDA processing units 16-1 and 16-2 perform the judgment processing of whether pixels of the original image data 20 are to be copied onto the contacted image data 22 or to be thinned without being copied for each pixel position starting from the row leading pixel or column leading pixel, on the basis of the sum total calculation and the comparison judgment. First, the DDA processing units 16-1 and 16-2 figure out the current sum total at the current pixel position from the sum total at the most recent pixel position and contracted image size, by (Current sum total)=(most recent sum total)+(contracted image size)

$$SUM=SUM+DX \quad (3)$$

$$SUM=SUM+DY \quad (4)$$

The thus figured out current sum total is then compared with the original image size. If the result of this comparison meets conditions for the current sum total not less than the original image size, i.e., (Current sum total)≧(original image size)

$$SUM \geq SX \quad (5)$$

$$SUM \geq SY \quad (6)$$

then pixels at the current pixel position are copied onto the contracted image data 22. After the completion of the pixel copy, the next sum total required for the next processing is figured out by subtracting the original image size from the current sum total as follows.

(Next sum total)=(current sum total)−(original image size)

$$SUM=SUM-SX \quad (7)$$

$$SUM=SUM-SY \quad (8)$$

On the contrary, if the current sum total is less than the original image size, i.e., if conditions (Current sum total)<(original image size)

$$SUM<SX \quad (9)$$

$$SUM<SY \quad (10)$$

are satisfied, then the pixels at the current processing position are thinned out without being copied onto the contracted image data 22. When this thinning is executed, the next sum total for use in the next pixel position processing can be the current sum total. That is, (Next sum total)=(current sum total)

$$SUM=SUM \quad (11)$$

Thereafter, for the second or subsequent pixel to the final pixel in the rows or columns, the X-direction contraction processing unit 10 iterates the above processings (3), (5), (7), (9) and (11) whereas the Y-direction contraction processing unit 12 iterates the above processings (4), (6), (8), (10) and (11). Then when returning to the first pixel at the next row or next column after the completion of the processing of the last pixel at that row or column, the X-direction contraction processing unit 10 and the Y-direction contraction processing unit 12 again figure out the random numbers from the expressions (1) and (2), respectively, to make initialization of the sum totals to thereafter repeat the same processings.

FIG. 2 is an explanatory diagram of the program structure corresponding to the image size transforming apparatus of FIG. 1. This program structure is made up of an X-direction contraction processing program 24 and a Y-direction contraction processing program 26. The X-direction contraction processing program 24 and the Y-direction contraction processing program 26 store therein the procedures for executing the processing steps of the initial value setting units 14-1 and 14-2 and the DDA processing units 16-1 and 16-2 of FIG. 2, respectively.

FIGS. 3A and 3B are flowcharts of the image contraction processing effected by the image size transforming apparatus of FIG. 1, which correspond to the processings by the associated program features of FIG. 2. First in step S1 the initial processing is carried out which includes defining the original image size (SX, SY), the contracted image size (DX, DY), the original image processed pixel position (SPX, SPY), the contracted image pixel position (DPX, DPY) and the DDA sum total (SUM). Then in step S2, the random number is figured out from the calculation formula, i.e., since the X-direction contraction processing is first carried out in this case, the initialized sum total (SUM) is figured out from the expression (1). Then in step S3, the pixel position initialization is carried out. That is, the pixel positions of the original image and the contracted image are initialized to the origin (0, 0). This origin is positioned at the upper left corner of the original image data 20 and the contracted image data 22 stored in the image memory 18 of FIG. 2 for example. Then in step S4, a check is made to see if the Y-direction processing has been terminated or not, to set the processed image position SPY to the original image size SY. It is then checked in step S5 whether the X-direction processing has been terminated or not, to set the processed pixel position SPX to the original image size SX. Then in step S6, for the leading pixel in the first row of the original image, the sum total addition processing is carried out from the expression (3). The sum total of the first term of the right side at that time is the initialized sum total which has been initialized by the random numbers in step S2. A check is then made in step S7 to see if the sum total SUM is equal to or more than the original image size SX. If affirmative, then the procedure goes to step S8, allowing a pixel at the pixel position (SPX, SPY) of the original image currently being processed to be copied to the contracted image pixel position (DPX, DPY). After the completion of the copy, the sum total SUM of the next pixel position in accordance with the expression (7) is figured out. Although the original image size SX to be subtracted from the sum total is normalized for the subtraction of 1 in the block of step S8, this is substantially equivalent to the expression (7). After the calculation of the sum total SUM at the next pixel position in this manner, the contracted image pixel position DPX is incremented by one to shift the position, and then in step S9 the original image pixel position SPX is incremented by one for the shift to the next pixel. Then with the return to step S5, the processings of the steps S6 to S8 are iterated till the termination of all the X-direction pixels. Naturally, if the sum total SUM is less than the original image size SX in step S7, then the copying processing is not carried out in step S8 but in step S9 the shift of the next pixel of the original image is carried out. After the completion of the processings for the first one row in the X-direction in this manner, the X-direction termination is judged in step S5, allowing the procedure to go to step S10 to perform the X-direction preparation processing of the next row. This next row X-direction preparation processing also includes again determining the random number from the calculation formula, initializing the sum total by the expression (1) to find the initialized sum total, and thereafter returning to step S4 to iterate the same processing for the next X-direction row. When all the X-direction processings for the original image are terminated as a result of the iteration of the processings of steps S4 to S10, the procedure advances from step S4 to step S11 to start the Y-direction contraction processing. In steps S11 to S9, the Y-direction contraction processing is carried out that essentially iterates the same process steps as those of the X-direction processing as shown in steps S2 to S10 except that the pixel direction is the Y-direction, i.e., the column direction. Then in the case of the Y-direction column as well, after the termination of the processing up to the final column, it is judged in step S13 whether the X-direction processing has been terminated or not, to bring the series of the contraction processing to an end.

FIG. 4 shows the contraction processing by the FIG. 1 embodiment in a specific manner. The original image data 20 are image data having 10 dots in the X and Y directions by way of example. This original image data 20 are periodic image data having interference fringes in the Y direction, i.e., vertical direction. Such periodic image data 20 are first subjected to the X-direction contraction processing. On the left side of the original image data 20 is shown a random number column 25 indicative of the random numbers determined by the calculation formula upon the sum total initialization previous to each row leading pixel processing. Herein, assume that the original image 20 is reduced to a contracted image 22 whose size is half of that of the original image. Thus, the original image size SX, SY is given as $SX=10$ $SY=10$ and the contraction image size DX, DY is given as $DX=5$ $DY=5$ Previous to the processing of the leading pixel in the first row of the original image data 20, i.e., the pixel at the origin (0, 0), the random number 40 is acquired from the calculation formula. After such acquisition of the random number RAND=40, the sum total initialized by the expression (1), i.e., the initialized SUM is found resulting in SUM=40% 10=0. After such a calculation of the initialized SUM by use of the random number, is carried out either the processing for copying the original image pixels onto the contracted image 22 pixels on the basis of the expressions (3), (5), (7), (9) and (11) or the processing for thinning them without being copied. The contraction processings from the first row first pixel to the tenth pixel are summarized as follows.

Pixels at positions (1, 1) to (10, 1)
Random number=40
Initialized SUM=40% 10=0

| [Pixel Position] | [Sum Total Comparative Judgement] | [Processing] | [Next Sum Total] |
|---|---|---|---|
| 1st pixel | SUM = (0 + 5)/10 < 1 | thinned out | 5 |
| 2rd pixel | SUM = (5 + 5)/10 ≥ 1 | pixel copied | 0 |
| 3rd pixel | SUM = (0 + 5)/10 < 1 | thinned out | 5 |
| 4th pixel | SUM = (5 + 5)/10 ≥ 1 | pixel copied | 0 |
| 5th pixel | SUM = (0 + 5)/10 < 1 | thinned out | 5 |
| 6th pixel | SUM = (5 + 5)/10 ≥ 1 | pixel copied | 0 |
| 7th pixel | SUM = (0 + 5)/10 < 1 | thinned out | 5 |
| 8th pixel | SUM = (5 + 5)/10 ≥ 1 | pixel copied | 0 |
| 9th pixel | SUM = (0 + 5)/10 < 1 | thinned out | 5 |
| 10th pixel | SUM = (5 + 5)/10 ≥ 1 | pixel copied | 0 |

As a result, the pixels in the first row of the original image 20 are contracted in the X-direction as in intermediate image data 21 by the X-direction contraction. Then previous to the processing of the leading pixel in the second line, the random number is determined as the random number RAND=18 to thereafter iterate the contraction processing in the same manner. Then the processing advances to the leading pixel in the last tenth row, to figure out the random number RAND=77 in this case. The results of processings from the leading pixel in the tenth row to the last tenth pixel are as follows.

Pixels at positions (10, 1) to (10, 10)
Random number=77
Initialized SUM=77% 10=7

| [Pixel Position] | [Sum Total Comparative Judgement] | [Processing] | [Next Sum Total] |
|---|---|---|---|
| 1st pixel | SUM = (7 + 5)/10 ≥ 1 | pixel copied | 2 |
| 2rd pixel | SUM = (2 + 5)/10 < 1 | thinned out | 7 |
| 3rd pixel | SUM = (7 + 5)/10 ≥ 1 | pixel copied | 2 |
| 4th pixel | SUM = (2 + 5)/10 < 1 | thinned out | 7 |
| 5th pixel | SUM = (7 + 5)/10 ≥ 1 | pixel copied | 2 |
| 6th pixel | SUM = (2 + 5)/10 < 1 | thinned out | 7 |
| 7th pixel | SUM = (7 + 5)/10 ≥ 1 | pixel copied | 2 |
| 8th pixel | SUM = (2 + 5)/10 < 1 | thinned out | 7 |
| 9th pixel | SUM = (7 + 5)/10 ≥ 1 | pixel copied | 2 |
| 10th pixel | SUM = (2 + 5)/10 < 1 | thinned out | 7 |

After the acquisition of the intermediate image data 21 as a result of termination of the X-direction contraction processing for the original image 20 in this manner, the random numbers as shown in the random number row 27 are acquired for the intermediate image data 21 at the Y-direction leading pixel position from the calculation formula while simultaneously performing the contraction processing similarly, whereupon the contacted image data 22 reduced into 5×5=25 dots in the vertical and transverse directions can be obtained.

Figure 5:
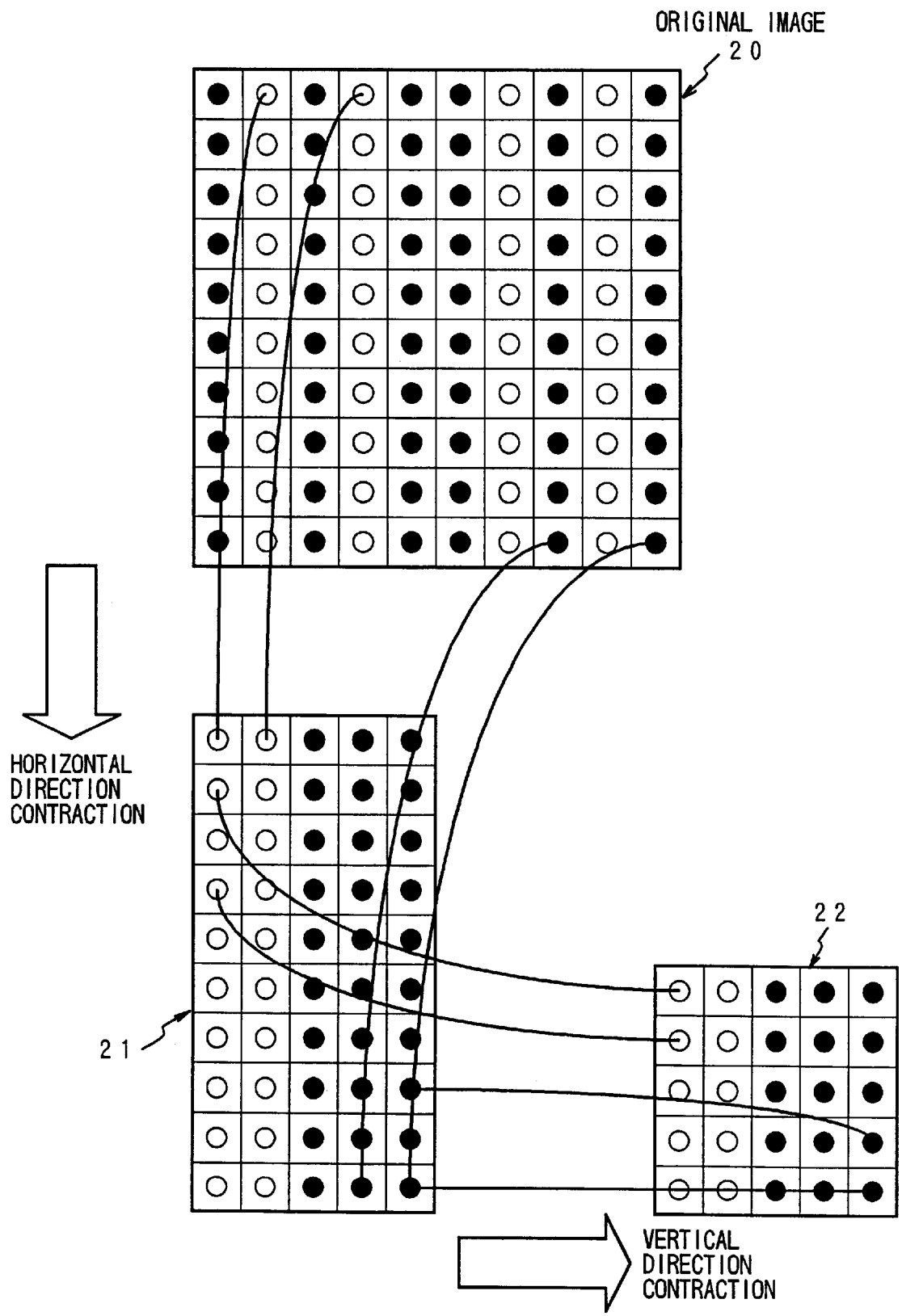
FIG. 5 is an explanatory diagram of the comparative example of the contraction processing when the initial value by the random numbers is not used.

FIG. 5 shows the comparative example in the case where the sum total is initialized to SUM=0 for the contraction processing without initialization of the sum total by use of the random numbers for the original data 20 similar to FIG. 4. In the event of making the initialization without use of the random numbers of FIG. 5, for example, in case of contracting the original image 20 in the X direction, all the sum totals SUM are initialized to SUM=0 upon the processing of the leading pixels in the first row to tenth row, with the result that the copying and thinning of pixels of the original image data 20 are carried out for the intermediate image data 21 with the exactly the same pattern in each row. More specifically, the second, fourth, sixth, eighth and tenth pixels in each row of the original image 20 are copied onto the intermediate image data 21, and the remaining first, third, fifth, seventh and ninth pixels are thinned out without being copied. This allows the vertical interference fringes of the original image data 22 to be reflected on the intermediate image 21 contracted in the X-direction. The intermediate image data 21 are then subjected to the Y-direction contraction processing. In this Y-direction contraction processing as well, all the sum totals SUM are initialized to the same SUM=0 previous to each row leading pixel processing of the intermediate image data 21, and therefore each row has exactly the same pattern of whether the pixels are to be copied or thinned out. As a result, the final contracted image data 22 derived from the Y-direction contraction have the pixel arrangement on which the interference fringes of the original image data 20 are reflected. As compared with the contraction processing by the sum total initialization using the random numbers of the present invention of FIG. 4, the contracted image data 22 obtained by the contraction processing of the present invention do not permit the reflection thereon of the periodic interference fringes of the original image data 20 so that the same white-to-black gradation as the original image data can be obtained by virtue of the randomly distributed arrangement of the black and white dots in the contracted image data.

Figure 6:
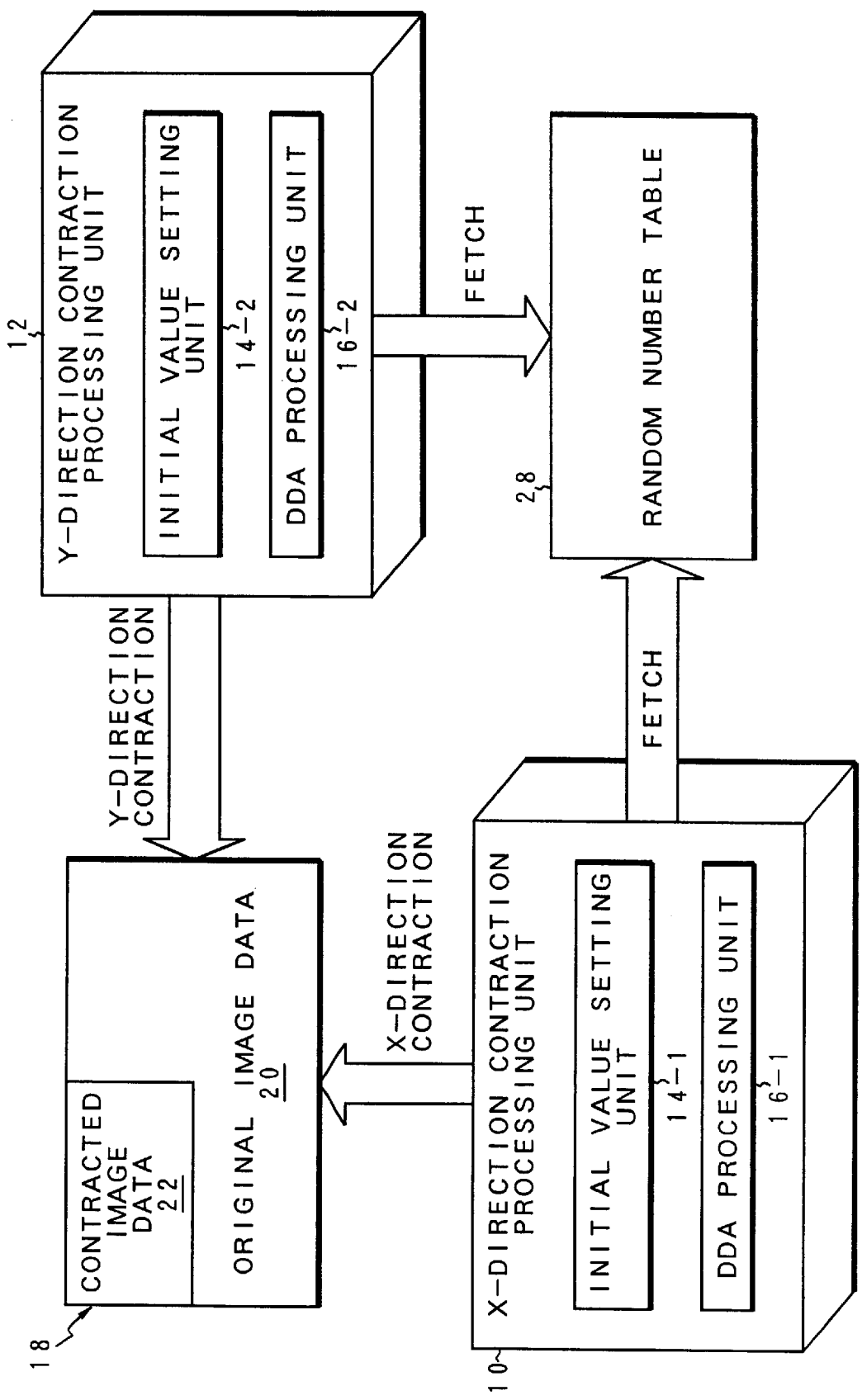
FIG. 6 is a block diagram of another embodiment of the present invention using a random number table.

FIG. 6 shows another embodiment of the image size transforming apparatus in accordance with the present invention, which is characterized in that the random numbers for use in the sum total initialization of the DDA processing are acquired by use of a random number table, instead of the calculation formula. The image size transforming apparatus of this embodiment comprises the random number table designated at 28 in addition to the X-direction contraction processing unit 10, the Y-direction contraction processing unit 12 and the image memory 18. The random number table 28 stores fixedly a predetermined number of random numbers figured out from the calculation formula so that the initialization setting units 14-1 and 14-2 provided in the X-direction contraction processing unit 10 and the Y-direction contraction processing unit 12, respectively, refer to the random number table 28 previous to the start of processing of the leading pixel in the row or column, to thereby extract the random numbers one after another, for the sum total initialization. The number of elements of the random numbers stored in the random number table 28 is set to be larger than the number of larger one of the vertical and horizontal size of the original image.

FIG. 7 is an explanatory diagram of the program structure corresponding to the embodiment of FIG. 6. This program structure includes an X-direction contraction program 30 and a Y-direction contraction program 32 in addition to the random number table 28.

Figure 8B:
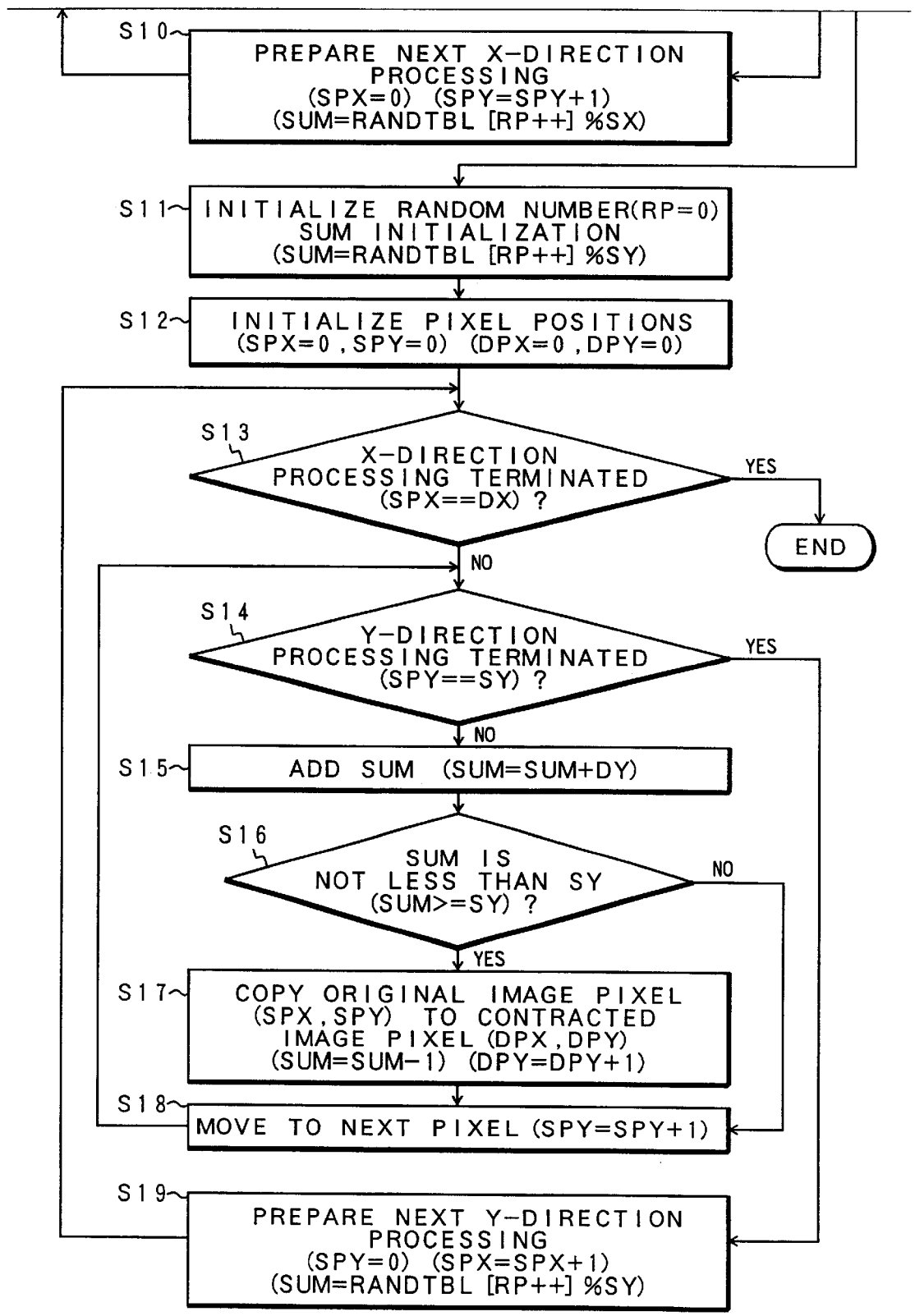

FIGS. 8A and 8B are flowcharts of the contraction processing in the embodiment using the random number table of FIG. 6. In this contraction processing using the random number table, the initialization processing of step S1 newly includes defining the adoption point RP of the random number table. In the sum total initialization processing of step S2, the random number initialization of RP=0 indicative of the random number table adoption point is first carried out so that the random number table 28 is referred to by the initialized random number RP=0 to obtain the random numbers. That is, the random number table 28 is acquired through the reference by RANDTBL [RP++] to figure out the initialized sum total SUM from $$SUM=RANDTBL[RP++] \% DX$$

The X-direction contraction processings of steps S3 to S10 following step S2 are substantially the same as the case of the flowchart of FIG. 4 excepting the acquisition of a new random number RANDTBL [RP++] previous to the next row leading pixel processing by reference to the random number table 28 similar to the step S2. The Y-direction contraction processings of steps S11 to S19 include executing the initialization RP=0 of the random number table adoption point RP in step S11 to acquire the random numbers from the random number table 28 and referring to the random number table 28 previous to the shift to the next row leading pixel processing, to thereby acquire new random numbers. In this manner, the random numbers for use in the sum total initialization previous to the row or column leading pixel processing of the DDA processing are acquired by reference to the random number table 28 prepared in advance, instead of the calculation formula, thereby enabling the processing speed to increase by the time required for the calculations of the random numbers.

Figure 9A:
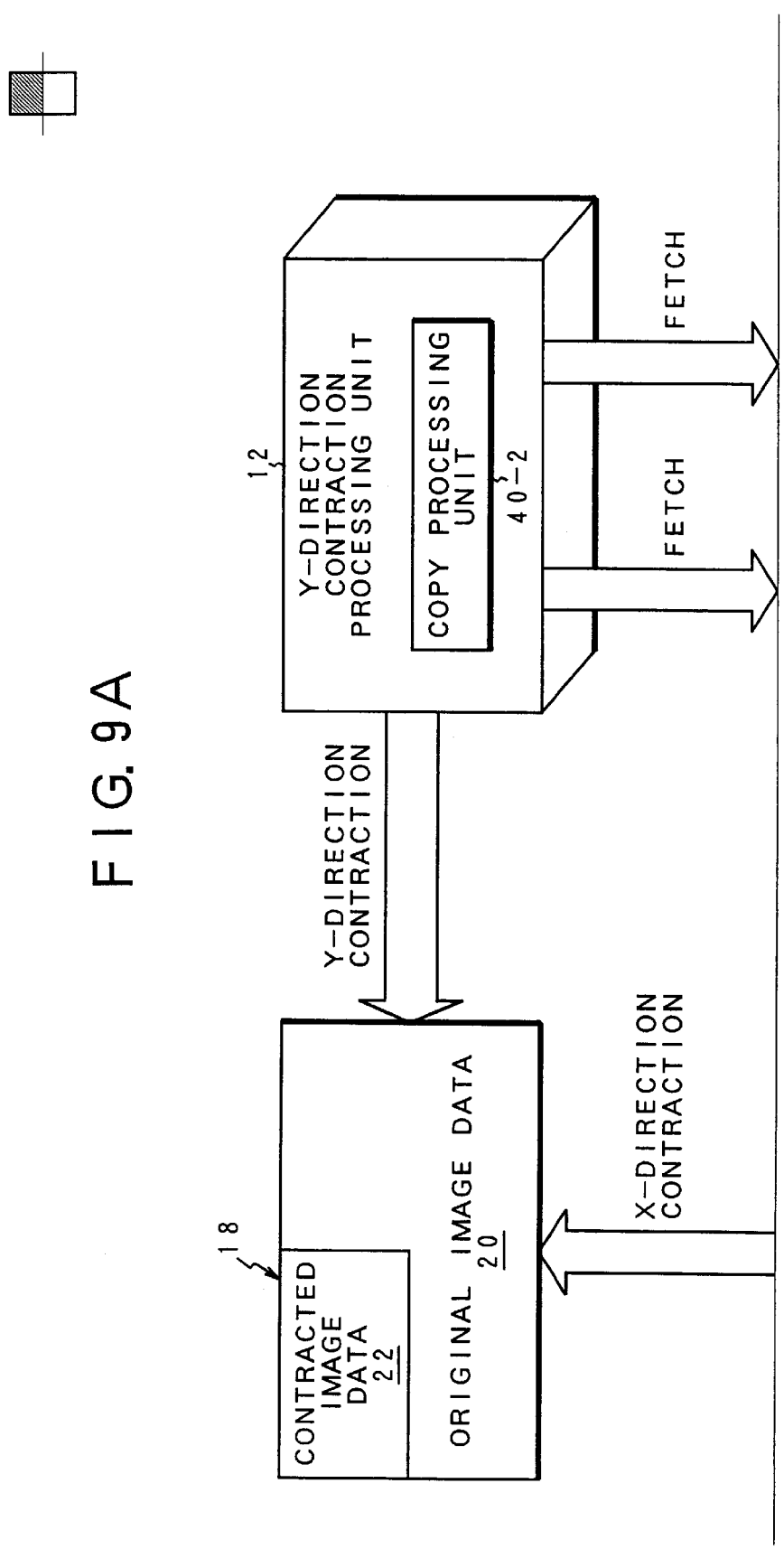
FIG. 9 is a block diagram of another embodiment of the present invention in which the contraction processing is carried out through a random number based selection of a pattern of a pattern table created by the DDA algorithm.
Figure 9B:
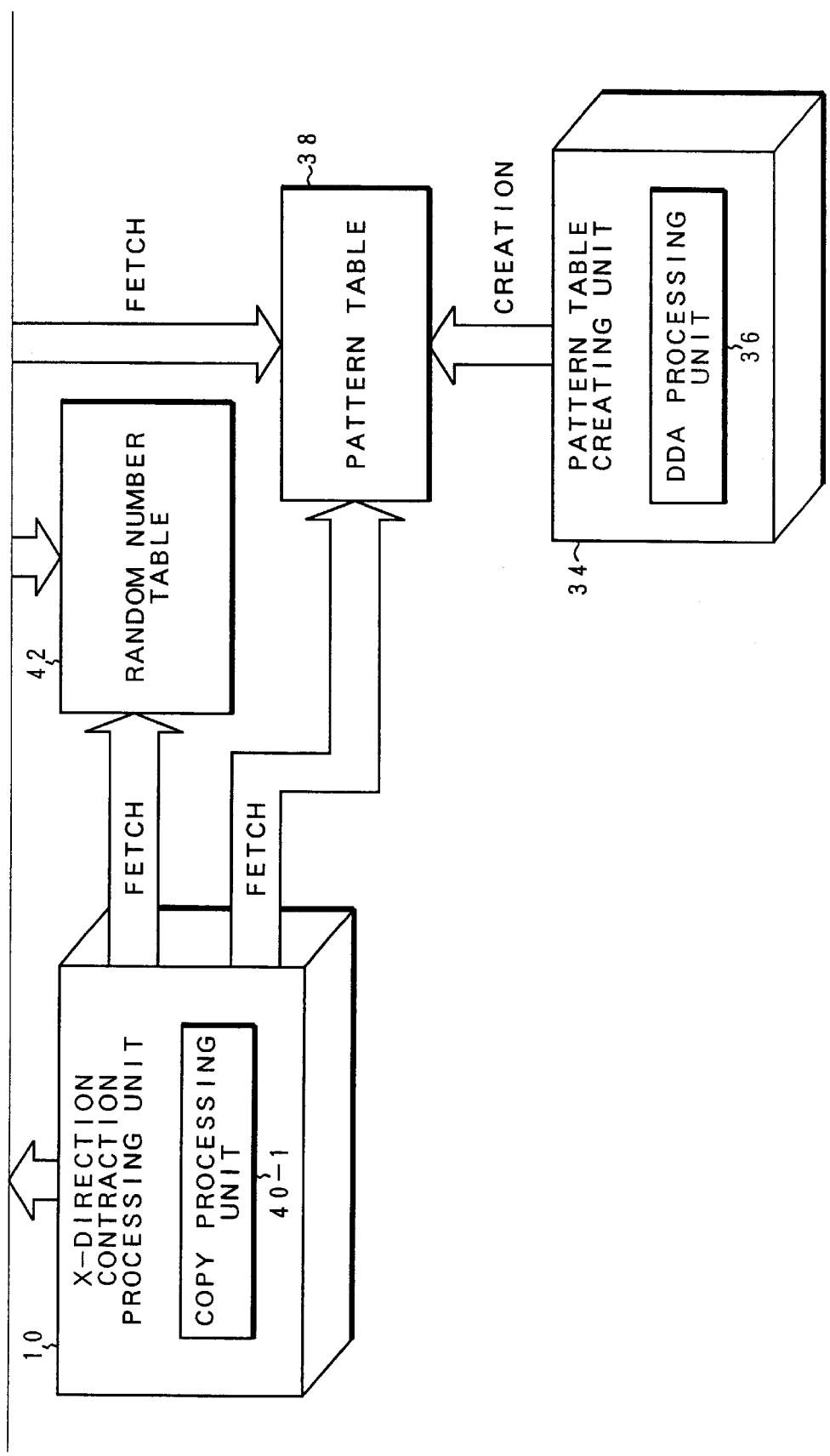

FIG. 9 is a block diagram of a further embodiment of the image size transforming apparatus in accordance with the present invention, which is characterized in that a pattern table is provided to store a plurality of bit patterns determining whether the row or column pixel data of the original image are to be copied onto a contracted image or to be thinned out and that a bit pattern to be used is selected from this pattern table by use of a random number to thereby make a copy from the original image onto a contracted image and a thinning. The image size transforming apparatus of this embodiment comprises the X-direction contraction processing unit 10, the Y-direction contraction processing unit 12, the image memory 18, a pattern table creating unit 34, a pattern table 38 and a random number table 42. The pattern table creating unit 34 includes a DDA processing unit 36 to create the pattern table 38. For the row or column pixel array of the original image data 20, the DDA processing unit 36 included in the pattern table creating unit 34 creates a bit pattern indicative of the execution or nonexecution of the copy of each pixel of the original image data 20 onto a contracted image data 22, by the digital differential analysis processing. The basic bit pattern created in this DDA processing unit 36 can have a larger bit count than the pixel count of larger one of the vertical and horizontal sizes of the original image data 20. The basic bit pattern indicative of the execution or nonexecution of copy thus created by the DDA processing unit 36 is shifted by predetermined bits to obtain a plurality of bit patterns for the storage into the pattern table 38. The pattern table 38 stores therein 16 different bit patterns inclusive of the basic bit pattern created by the DDA processing unit 36. In case of contracting 909 dpi dot image data into 400 dpi dot image data, to determine the number of the bit patterns, the number of patterns was increased to 2, 4, 8 and 16. 16 patterns made it impossible to recognize the interference fringes of the contracted image and 32 patterns presented substantially the same result. 16 patterns was thus selected. Naturally, the number of patterns may be different depending on the image periodicity. A larger number of patterns tend to cancel the periodicity of the contracted image, so that any number of patterns can be selected as needed. The X-direction contraction processing unit 10 and the Y-direction contraction processing unit 12 are provided with copy processing units 40-1 and 40-2, respectively. The copy processing units 40-1 and 40-2 select a bit pattern having the index determined by a random number from the pattern table 30 by use of the random number obtained by reference to the random number table 42, when extracting image data for one row defining X-direction or for one column defining Y-direction from the original image data 20 to make the transform into the contracted image data 22. The copy processing units 40-1 and 40-2 use the thus selected bit pattern to execute the copy processing of the pixels of the original image data 20 to the pixels of the contracted image data 22 or thinning processing of the pixels of the original image data 20. In the random number based reference to the pattern table 38 by the copy processing units 40-1 and 40-2, the use pattern table number I for use in the reference to the pattern table 38 is defined as the remainder of division of the random number obtained by reference to the random table 42 by the pattern number 16 included in the pattern table 38. That is, the use pattern table number I is given as $$I=RANDTBL[RP++]\% 16$$

FIG. 10 is an explanatory diagram of the program structure corresponding to the embodiment of FIG. 9. This program structure comprises a pattern table creating program 44 which creates the pattern table 38, and an X-direction contraction processing program 46 and a Y-direction contraction processing program 48 which perform the contraction processings by selecting the bit pattern from the pattern table 38 on the basis of the random number obtained by reference to the random number table 42.

Figure 11:
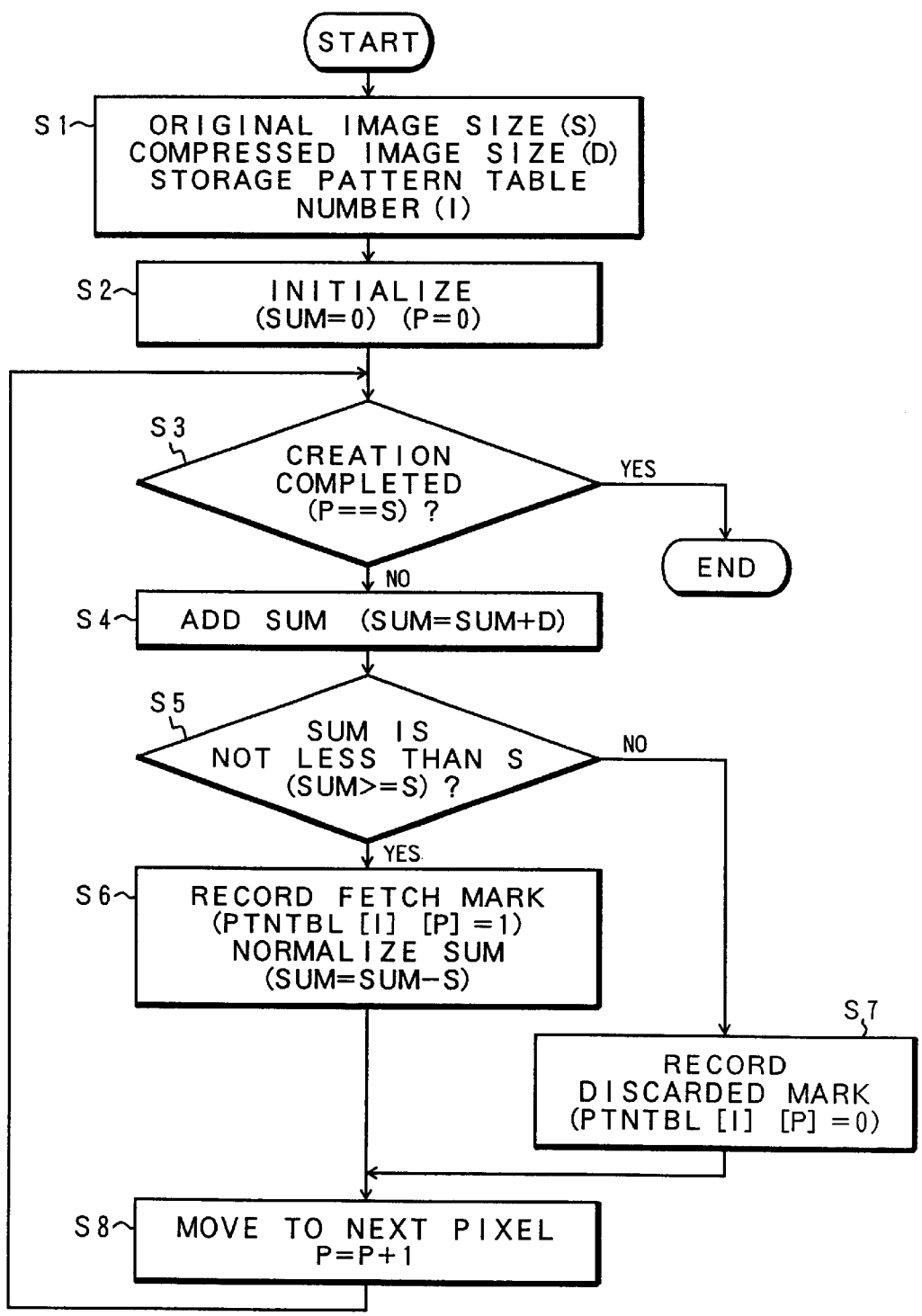
FIG. 11 is a flowchart of pattern table creation processing in FIG. 9.

FIG. 11 is a flowchart of the bit pattern creation processing effected by the DDA processing unit 36 provided in the pattern table creating unit 34 of FIG. 9. First, defined in step S1 are the original image size S, the compressed image size D and the storage pattern table number I. Then in step S2, the DDA sum total SUM is initialized to SUM=0, with P indicative of the bit position of the bit pattern being initialized to P=0. A check is then made in step S3 to see if the pattern bit position P has reached the original image size S. Initially P=0, and hence the procedure goes to step S4 in which the current sum total SUM at the current pixel position is obtained by adding the compressed image size D to the sum total SUM at the most recent pixel position, as $$SUM=SUM+D$$

It is then checked in step S5 whether the current sum total SUM is not less than the original size S. If it is not less than the original size S, then the procedure goes to step S6 to make a record of the fetch mark for copying the original image pixels onto the contracted image pixels, i.e., $$PTNTBL[I][P]=1$$

The fetch mark record 1 means that the original image pixels are copied onto the contracted image pixels. The sum total SUM at the next pixel position is figured out from $$SUM=SUM-S$$

A shift to the next pixel is made in step S8, returning to the processing of step S3.

If the current sum total SUM is less than the original image size S in step S5, then the procedure goes to step S7 to set discard mark record as (PTNTBL[I][P]==0). The 0 bit mark designates thinning of the original image pixels without copy thereof. A series of processings are terminated when the record is complete of the bit pattern fetch mark in the pattern table and of the discard mark for use in the thinning, for the pixel count of the original image size S in this manner.

FIG. 12 shows an example of the pattern table 38 of FIG. 9, storing 16 bit patterns P1 to P16 therein. A bit string of the bit pattern P1 is a basic bit pattern created in accordance with the flowchart of FIG. 12 by the DDA processing unit 36 of the pattern table creating unit 34 of FIG. 10. In this embodiment, the remaining 15 bit patterns P2 to P16 are patterns obtained by backward shifting the bit pattern P1 by one bit in sequence.

FIGS. 13A and 13B are flowcharts of the image contraction processing effected in the embodiment using the pattern table of FIG. 9. First, newly defined as initialization processing in step S1 is the use pattern table number (I) for selecting the bit pattern from the pattern table 38, in addition to the original image size, the contracted image size, the original image processed pixel position, the contracted image pixel position and the random table adoption point. Then in step S2, 16 bit patterns are created as bit patterns for X-direction contraction in the pattern table 38. The creation of the pattern table in step S2 is carried out in accordance with the flowchart of FIG. 11. After the creation of the pattern table having 16 bit patterns in step S2, the pixel position to be processed is initialized in step S3 and the Y-direction processing termination is checked in step S4, after which the use pattern table is determined by use of the random numbers. Since the random number table 42 of FIG. 9 stores in advance the random numbers larger than the vertical and horizontal size of the original image data 20, the random numbers are read one after another from the foremost one to determine the use pattern table number I as the remainder of division of the random numbers by the number 16 of the patterns of the pattern table. A check is then made in step S5 of the X-direction processing termination and in step S7 a bit is read which corresponds to the pixel position to currently be processed, i.e., the foremost pixel of the selected use pattern table bit pattern. If the extracted bit is 1 in step S7, then the procedure goes to step S8 in which the original image pixels are copied onto the contracted image pixels to shift the position of the contracted pixels by one. Thereafter, in step S9 the original image pixels are shifted by one, returning to the processing of step S6. If the bit extracted from the bit pattern is 0 in step S7, then the step S8 is skipped so that the original image pixels are thinned out without copying the original image pixels onto the contracted image pixels. If the termination of the processing of the final pixel in the currently processed row is judged in step S6 after the processing of the execution or nonexecution of the copy of the original image pixels by the currently selected use pattern table, the procedure goes to step S10 in which the X-direction processing of the next row is prepared allowing the procedure to return to step S4. In the next step S5, the next random number is acquired by again referring to the random number table, previous to the processing of the foremost pixel of the next row, to thereby determine the use pattern table number I, to consequently iterate the pixel copy by the bit 1 of the newly selected bit pattern or the pixel thinning by the bit 0. When the X-direction contraction processing of all the rows providing the Y-direction is terminated in step S4, the procedure goes to step S11 to make the Y-direction contraction processing. In this Y-direction contraction processing as well, 16 pattern tables for use in the Y-direction contraction processing are created in accordance with the flowchart of FIG. 11 for the storage into the buffer table 38 in step S11, after which in step S12 the pixel position is initialized and in steps S13 to S19 the pixel copy and thinning are carried out by use of the bit pattern by the use pattern table number (I) determined based on the random number in step S14, one after another from the foremost one of the row direction pixels providing the Y-direction. The termination of the X-direction final row processing results in the completion of the Y-direction contraction, to terminate the series of processings.

Figure 14B:
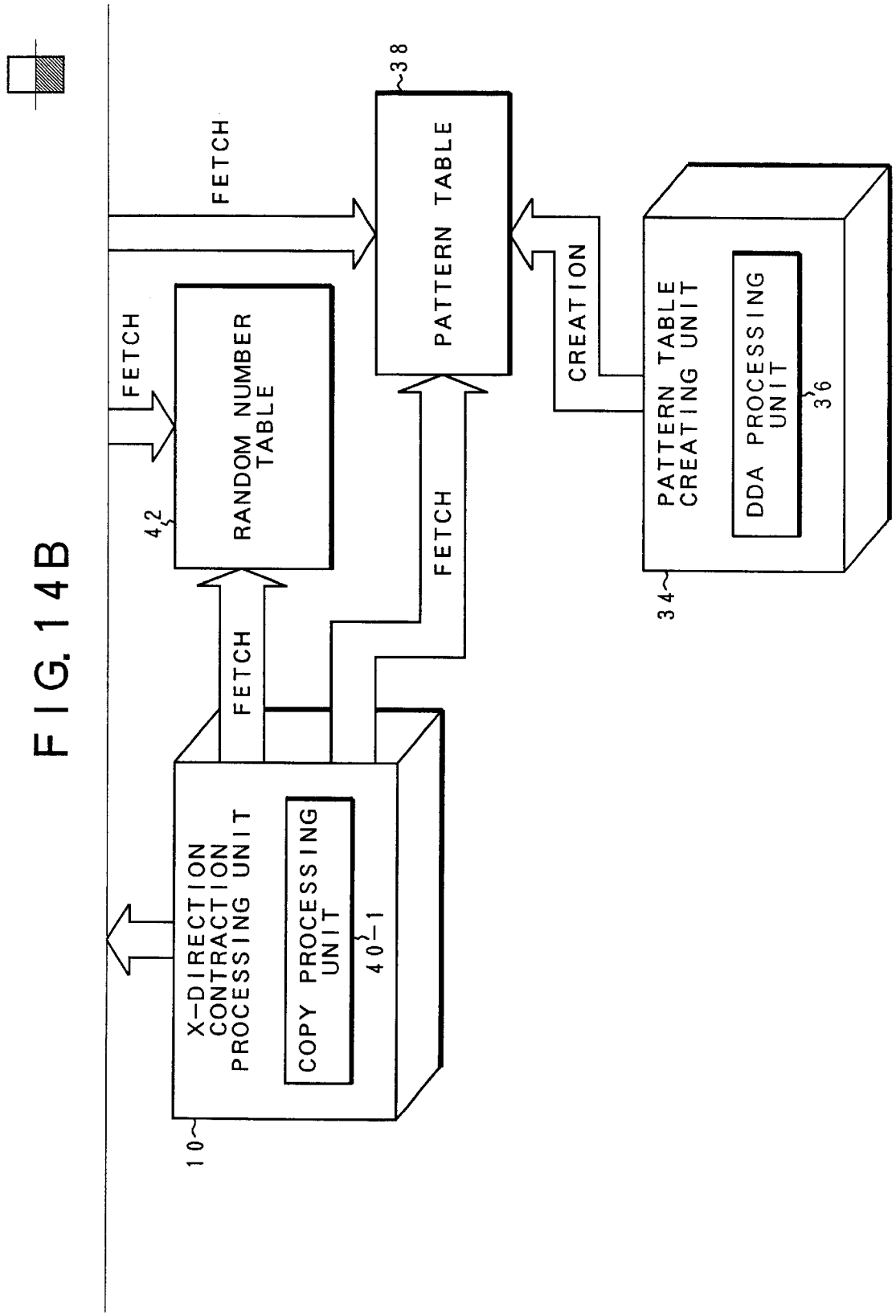

FIGS. 14A and 14B show a yet further embodiment of the image size transforming apparatus of the present invention which is basically the same as the embodiment of FIG. 9 and which is characterized in that additionally the original image data of the image memory 18 are converted from binary data (bit data) into byte data for the DDA based contraction processing, after which the byte data derived from the contraction processing are again converted into the original bit data to acquire contracted image data. Similar to the embodiment of FIG. 9, the image size transforming apparatus of this embodiment comprises the X-direction contraction processing unit 10, the Y-direction contraction processing unit 12, the pattern table creating unit 34, the pattern table 38, the random number table 42, and the image memory 18 for storing the image data 20 and the contracted data 22. In addition thereto, it further comprises a binary/1 byte converting unit 49 and an intermediate buffer 45 and a 1 byte/binary converting unit 50, which are interposed between the image memory 18 and the X-direction contraction processing unit 10 and the Y-direction contraction processing unit 12. The binary/1 byte converting unit 49 extracts the original image data 20 of the image memory 18 by 1 byte data in the row or column direction, to convert each bit data into byte data. Pixel data converted by the binary/1 byte converting unit 49 into the byte data are stored as an intermediate buffer image 51 in the intermediate buffer 45. For this reason, since all the intermediate buffer data 51 are in the form of the byte data converted from 1-bit data having 0 or 1 as the bit value, i.e., the pixel of the binary original image data 20 of the image memory 18, the X-direction contraction processing unit 10 and the Y-direction contraction processing unit 12 perform a processing in which copy is carried out onto contracted image data with bit 1 of the bit pattern selected from the pattern table 38, with all the binary pixels as the byte data, and in which the thinning is made without copying with bit 0. After the completion of the contraction processing by the X-direction contraction processing unit 10 and the Y-direction contraction processing unit 12, the intermediate buffer image data 51 on the intermediate buffer 45 result in contracted image byte data which in turn are converted into original binary bit data by the 1 byte/binary converting unit 50 and are stored as the contracted image data 22 in the image memory 18.

Figure 15B:
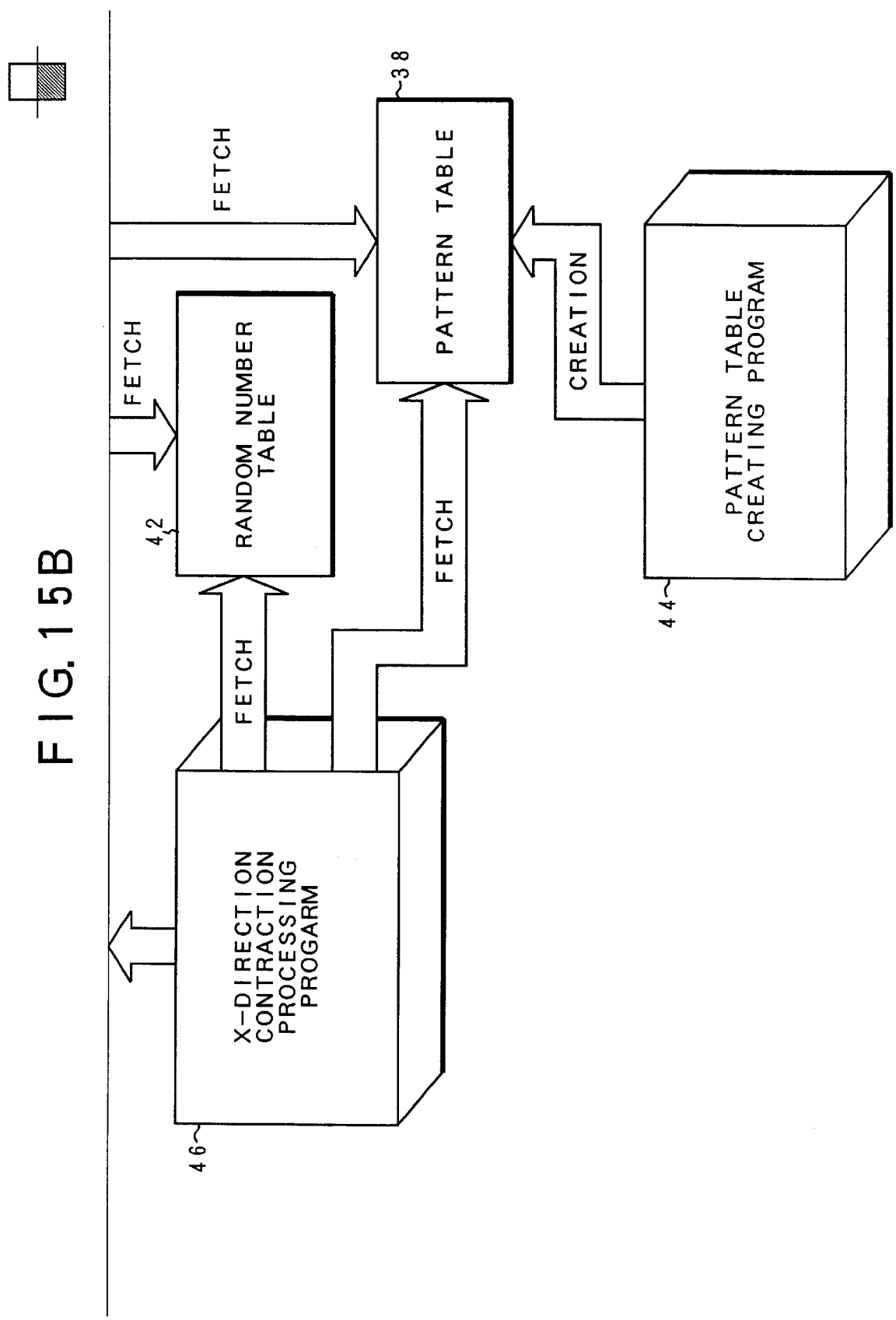
FIG. 15 is an explanatory diagram of the program structure corresponding to FIGS. 14A and 14B.

FIG. 15 is an explanatory diagram of the program structure corresponding to FIGS. 14A and 14B. This program structure is similar to the embodiment of FIG. 10 in that it comprises the pattern table creating program 44, the X-direction contraction program 46, the Y-direction contraction program 48, the pattern table 38 and the random number table 42. Additionally, corresponding to the embodiment of FIGS. 14A and 14B, it further comprises a binary/1 byte converting program 52 and a 1 byte/binary converting program 54 so that the original image data 20 are converted into the intermediate buffer image data 48 of a byte configuration for contraction processing and thereafter again are restored to the contracted image data 22 of a bit configuration.

Figure 16:
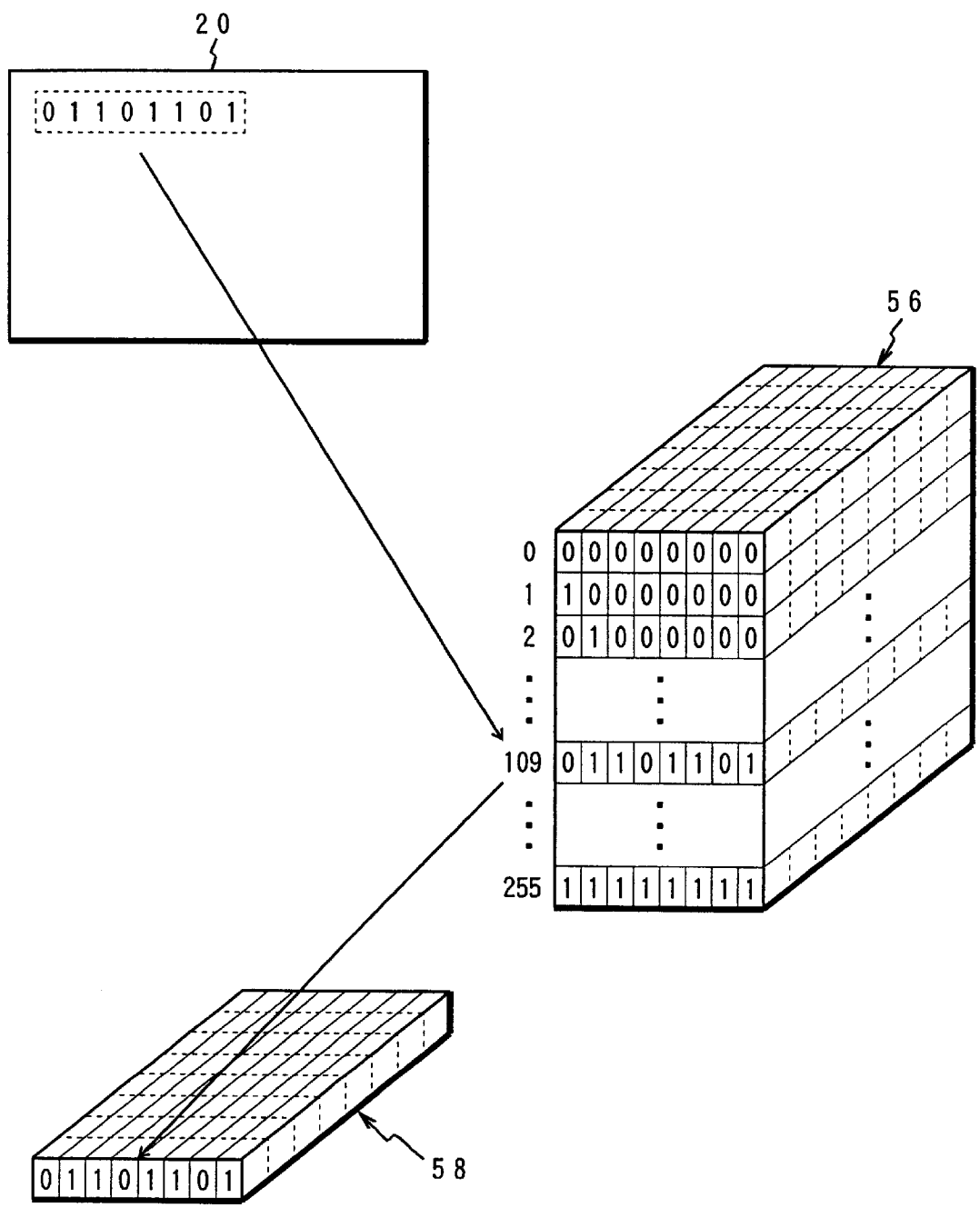
FIG. 16 is an explanatory diagram of a binary/one byte conversion in FIGS. 14A and 14B.

FIG. 16 is an explanatory diagram of the conversion processing effected by the binary/1 byte converting unit 46 of FIGS. 14A and 14B. Given the processing from the first row for example of the original image data 20, eight bits from the leading bit in the first row are extracted and reference is made to a conversion table 56 previously provided in the binary/1 byte converting unit 46. The conversion table 56 has table addresses 0 to 255 determined by the decimal value of 8-bit data of the original image data 20, with the table addresses 0 to 255 each storing eight byte data which include the leading bit in the form of binary data of each pixel and the remaining bits all being bit 0. If the leading eight bits of the original image data 20 is "01101101" for example, this represents 109 in decimal (7D in hexadecimal). Hence, reference is made to the conversion table 56 by the decimal address 109, for the conversion into eight byte data 58 whose leading bits are "01101101".

Figure 17:
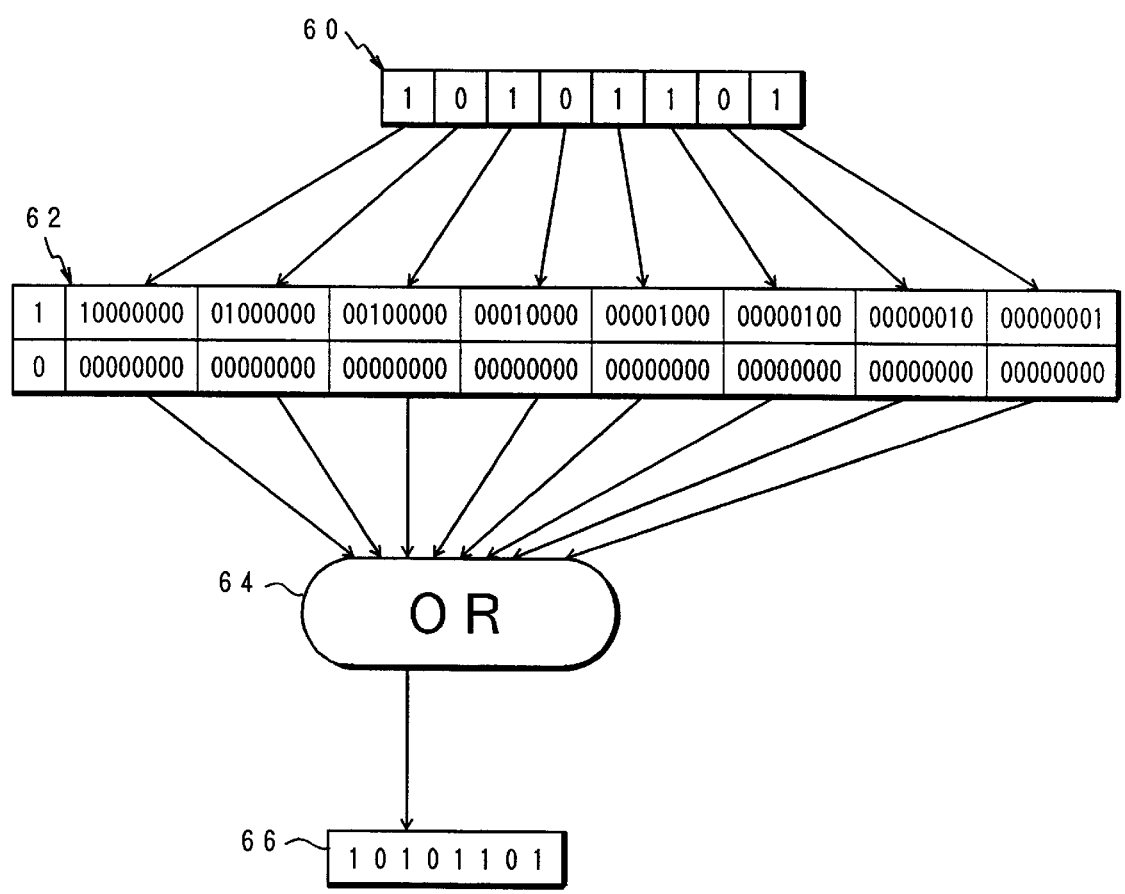
FIG. 17 is an explanatory diagram of a one byte/binary conversion in FIGS. 14A and 14B.

FIG. 17 is an explanatory diagram of the conversion processing from the byte data into bit data effected by the 1 byte/binary converting unit 50. If the intermediate buffer 45 stores eight byte data 60 whose leading bits are 10101101, these byte data are extracted and converted by the conversion table 62 into eight bit data. The conversion table 62 is divided into eight conversion regions corresponding to the positions of the eight byte data 60 and has eight conversion 8-bits corresponding to 0 or 1 of the leading bits of the eight byte data. More specifically, the leading bit 1 of the eight byte data 60 allows the selection of the upper 8-bit data of the conversion table 62, whereas the leading bit 0 of the eight byte data 60 allows the selection of the lower 8-bit data of all zeros of the conversion table 62. An OR circuit 64 carries out the logical OR operation of eight byte 8-bit data selected by the conversion table 62, for the conversion into 8-bit data 66.

Figure 18B:
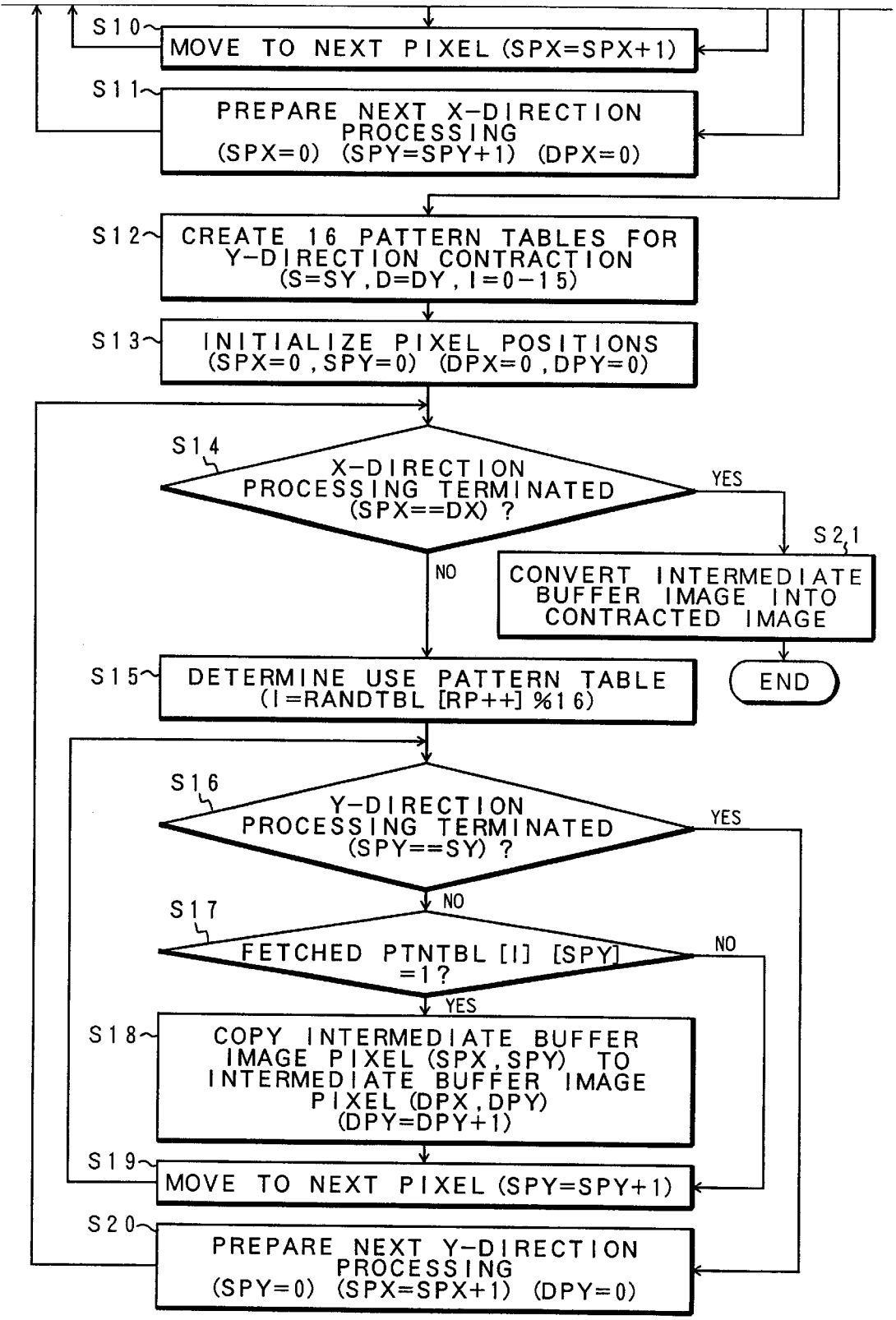

FIGS. 18A and 18B are flowcharts of the image contraction processing effected by the embodiment of FIGS. 14A and 14B. In this flowchart, the original image is transformed into an intermediate buffer image of byte configuration in step S2, after which the intermediate buffer image is subjected to the X-direction contraction processing in steps S3 to S11 and then to the Y-direction contraction processing in steps S12 to S20. Finally, in step S21, the intermediate buffer image byte data are converted into contracted image data in the form of binary bit data. Herein, the processings effected in steps S1, and S3 to S20 are the same as the contraction processings of steps S1, S3 to S10 and S11 to S19 of FIG. 14 in which the pattern table bit patterns are selected by the random numbers. In this manner, the embodiment of FIGS. 18A and 18B converts the original image data 20 into image data of byte configuration on the intermediate buffer 45 to effect the X-direction contraction processing and Y-direction contraction processing so that 1-bit data hard to handle on the computer can be converted into byte data of 8-bit configuration extremely easy to handle on the computer for the contraction processing and that the contraction processing can be effected by byte data handling with the contraction processing selecting 16 different bit patterns of the pattern table by the random numbers to determine the execution or nonexecution of the copy, thereby enabling the original image data compression processing speed to further increase.

Description will then be made of an embodiment of a computer readable record medium storing therein the image size transforming program of the present invention. The image size transforming program of the present invention may be stored in a carriable record medium such as a CD-ROM, a floppy disk, a DVD, a magneto-optical disk, an IC card, etc., or may be installed from a database or the other computer system by use of a modem or a LAN interface. The installed image size transforming program of the present invention is entered into a computer system and is implemented as an image contracting tool for the newspaper printing system using dot data for example. In this case, the computer installed image size transforming program of the present invention is recorded on its hard disk HDD and is executed by a CPU utilizing a RAM for example.

Although the above embodiments are directed to the case by way of example where the original image data are contracted and transformed into contracted image data, the transform processing for expanding the original image data for the transformation into an expanded image could also feasible in the same manner. In this original image expansion processing, it is determined whether the original image pixels are to be copied onto expanded image pixels in an overlapped manner on the basis of the value obtained by dividing the current sum total SUM figured out from the expressions (3) and (4), by the original image size. The quotient when the current sum total SUM is divided by the original image size inevitably results in at least 1, that is, if it is less than 2, then the original image pixels are intactly copied onto the expanded image, whereas if it is not less than 2, then the original image pixels are copied onto the expanded image pixels in an overlapped manner by the number of times equal to the integer not less than 2. In the case of both the original image copy and the original image overlapped copy, the remainder when the current sum total is divided by the original image size is used as the next sum total. In case of the embodiment of FIGS. 1 and 7, similar to the above contraction processing, in the image expansion processing based on such digital differential processing, the DDA sum total is initialized previous to the original image row or column leading pixel processing, using the random numbers by calculations or the random numbers by the random number table, thereby preventing the original image interference fringes from being reflected on the expanded image. In case of the embodiment of FIGS. 9, 14A and 14B, expanded image data can be acquired by creating 16 different bit patterns in the pattern table 38, the bit patterns determining whether the original image is to be copied onto the expanded image in an overlapped manner by the DDA processing unit 36 of the pattern table creating unit 34; selecting a pattern of the pattern table 38 by use of a random number obtained from the random number table 42; and making an overlapped copy of the original image pixels in conformity with the copy count of the selected bit pattern. Although in the above embodiments the original image data are shown to have a larger vertical and horizontal size with the contracted image data having a smaller vertical and horizontal size for easier understanding of the explanation, the actual apparatuses effects the contraction processing shown in the above embodiments equally when displaying the same size image by a high resolution apparatus and a low resolution apparatus. In cases where a certain printer has a resolution of 600 dpi for example, which is desired to be output by use of a 480 dpi printer, the dot count (resolution) per unit area will reduce in spite of the same on-printer image size. In this case as well, the transform from the 600 dpi original image into a 480 dpi contracted image is effected by the present invention.

According to the present invention as set forth hereinabove, even though a periodic, e.g., reflection pattern lies on any type of original image such as a binary image or a color image, random number components are involved in the pixel selections (execution or nonexecution of the copy) determined by the digital differential analysis, whereupon the occurrence of the interference fringes on the contracted image can securely be prevented irrespective of the presence of the interference fringes on the original image. Furthermore, the random number components for use in the pixel sections by the digital differential analysis are generated from the random number table so that the processing is further speeded up as compared with the acquisition of the random numbers by calculations.

In the further embodiment of the present invention, on the other hand, a plurality of different pattern tables each indicative of the execution or nonexecution of the overlapping or thinning are created in advance without calculating every time the pixel overlapping upon the image expansion or pixel thinning upon the image contraction by the digital differential analysis, and the pattern tables are selected at random on the basis of the random numbers for the contraction or expansion, whereby it is possible to reduce the amount of calculation involved in the digital differential analysis and to thereby further speed up the processing with the prevention of the occurrence of the original image interference fringes on the expanded or contracted post-transform image.

Furthermore, in case of creating for processing the pattern tables which determine the selection of the pixel overlapping or pixel thinning by the digital differential analysis, the original image data bit patterns are converted into byte data for the contraction or expansion processing and thereafter the contracted or expanded transformation image byte data are restored to the original bit data, whereby the original image pixel overlapping interpolation or thinning can be effected by use of easy-to-process byte format data to thereby achieve a further speedup of the image size transformation processing.

It will be appreciated that the present invention covers any appropriate variants without impairing its object and advantages and that it is not restricted by the numerical values indicated in the above embodiments.

What is claimed is:

1. An image size transforming apparatus comprising:
a DDA processing unit which creates an image expanded or contracted from an original image by a digital differential analysis; and
an initial value setting unit which sets a random number based initial value as a sum total initial value of said digital differential analysis, wherein
upon the image contraction, said DDA processing unit figures out a DDA sum total at a current pixel position by adding a contracted image size to an initialized DDA sum total, at an original image pixel initial position, but to a DDA sum total figured out at an immediately previous pixel position, at the other pixel positions, said DDA processing unit, if said DDA sum total is not less than the original image size, copying pixels at the current pixel position onto a contracted image and defining the result of subtraction of the image size from the current DDA sum total as the DDA sum total at the next pixel position, said DDA processing unit, if said DDA sum total is less than the original image size, thinning out pixels at the current pixel position without copy thereof and defining the current DDA sum total as the DDA sum total at the next pixel position, said DDA processing unit iterating the above processings, and wherein
said initial value setting unit determines a random number for each pixel initial position of said original image and defines the remainder when said random number is divided by the original image size as a DDA sum total initial value.

2. An apparatus according to claim 1, wherein said initial value setting unit generates said random numbers by use of a random number table.

3. An image size transforming method comprising:
an initial value setting step which includes setting a random number based initial value as a sum total initial value of a digital differential analysis (DDA); and
a DDA processing step which includes creating an image expanded or contracted from an original image by said digital differential analysis;
said initial value setting step including determining a random number for each pixel initial position of said original image and defining the remainder when said random number is divided by the original image size as a DDA sum total initial value;
said DDA processing step including, upon the image contraction, figuring out a DDA sum total at a current pixel position by adding a contracted image size to an initialized DDA sum total, at an original image pixel initial position, but to a DDA sum total figured out at an immediately previous pixel position, at the other pixel positions, said DDA processing step including, if said DDA sum total is not less than the original image size, copying pixels at the current pixel position onto a contracted image and defining the result of subtraction of the image size from the current DDA sum total as the DDA sum total at the next pixel position, said DDA processing step including, if said DDA sum total is less than the original image size, thinning out pixels at the current pixel position without copy thereof and defining the current DDA sum total as the DDA sum total at the next pixel position, said DDA processing step including iterating the above processings.

4. A computer readable record medium storing an image size transforming program therein, said image size transforming program comprising:

an initial value setting step which includes setting a random number based initial value as a sum total initial value of a digital differential analysis (DDA); and a DDA processing step which includes creating an image expanded or contracted from an original image by said digital differential analysis;

said initial value setting step including determining a random number for each pixel initial position of said original image and defining the remainder when said random number is divided by the original image size as a DDA sum total initial value;

said DDA processing step including, upon the image contraction, figuring out a DDA sum total at a current pixel position by adding a contracted image size to an initialized DDA sum total, at an original image pixel initial position, but to a DDA sum total figured out at an immediately previous pixel position, at the other pixel positions, said DDA processing step including, if said DDA sum total is not less than the original image size, copying pixels at the current pixel position onto a contracted image and defining the result of subtraction of the image size from the current DDA sum total as the DDA sum total at the next pixel position, said DDA processing step including, if said DDA sum total is less than the original image size, thinning out pixels at the current pixel position without copy thereof and defining the current DDA sum total as the DDA sum total at the next pixel position, said DDA processing step including iterating the above processings.

\* \* \* \* \*